United States Patent
Sheldon et al.

(10) Patent No.: US 11,126,009 B2
(45) Date of Patent: Sep. 21, 2021

(54) FLEXIBLE BRIDGE ASSEMBLY FOR EYEWEAR AND METHOD OF ASSEMBLING FLEXIBLE EYEWEAR

(71) Applicant: Brent Sheldon, Miami Beach, FL (US)

(72) Inventors: Brent Sheldon, Miami Beach, FL (US); Guy Brousseau, Jr., Marieville (CA)

(73) Assignee: Brent Sheldon, Miami, FL (US)

( * ) Notice: Subject to any disclaimer, the term of this patent is extended or adjusted under 35 U.S.C. 154(b) by 325 days.

(21) Appl. No.: 16/280,360

(22) Filed: Feb. 20, 2019

(65) Prior Publication Data
US 2019/0258077 A1    Aug. 22, 2019

Related U.S. Application Data

(60) Provisional application No. 62/632,921, filed on Feb. 20, 2018.

(51) Int. Cl.
*A61B 5/06* (2006.01)
*G02C 5/06* (2006.01)

(52) U.S. Cl.
CPC .......... *G02C 5/06* (2013.01); *G02C 2200/06* (2013.01); *G02C 2200/08* (2013.01); *G02C 2200/16* (2013.01)

(58) Field of Classification Search
CPC ... G02C 5/08; G02C 5/06; G02C 5/04; G02C 5/02
USPC ........ 351/124, 126, 127, 128, 129, 130, 133
See application file for complete search history.

(56) References Cited

U.S. PATENT DOCUMENTS

| | | | |
|---|---|---|---|
| 3,395,964 A | 8/1968 | Neider Dit Chartrice | |
| 9,122,076 B2 * | 9/2015 | Castillo | G02C 5/08 |
| D763,944 S | 8/2016 | Shin | |
| D769,962 S | 10/2016 | Markovitz et al. | |
| 9,527,252 B2 | 12/2016 | Sheldon et al. | |
| 9,753,306 B2 | 9/2017 | Allen | |
| D846,019 S | 4/2019 | Sanchez | |
| D855,689 S | 8/2019 | Miera | |
| 2011/0170050 A1 | 7/2011 | Berdou | |

OTHER PUBLICATIONS

Ray-Ban Junior Wrap Around Sunglasses; retrieved online Jan. 31, 2020; https://www.rakuten.com/shop/walk-into-fashion/product/ItemID12247498/.
Ray-Ban RB4147 Sunglasses; retrieved online Jan. 31, 2020; https://www.framesdirect.com/ray-ban-rb4147-sunglasses.
Ray-Ban RB4188 Wrap Sunglasses; Jul. 2, 2019; retrieved online Jan. 31, 2020; https://www.amazon.com/Ray-Ban-Mens-RB4188-Wrap-Sunglasses/dp/B0099S2304.
Ray-Ban RB4265 Chromance Mirrored Rectangular Sunglasses; Jun. 14, 2016; retrieved online Jan. 31, 2020; https://www.amazon.com/dp/B0115FFD8A.

(Continued)

*Primary Examiner* — Hung X Dang
(74) *Attorney, Agent, or Firm* — Dowell & Dowell, P.C.; Wendy L. Slade

(57) ABSTRACT

There is provided a flexible bridge assembly, in which rigid attachment members are at least partially contained or embedded in a flexible body to provide attachment points to lens retainers in the eyewear, with the flexible body therebetween allowing flexibility of the eyewear at or about the bridge area. Eyewear including such flexible bridge assemblies is also provided.

26 Claims, 22 Drawing Sheets

(56) References Cited

OTHER PUBLICATIONS

Ray-Ban Sport Sunglasses, posted at overstock.com; retrieved online Jan. 31, 2020; https://www.overstock.com/Clothing-Shoes/Ray-Ban-Sport-RB-4283CH-710-A3-Unisex-Tortoise-Frame-Bronze-Mirror-Chromance-Lens-Sunglasses/18224441/product.html.
Stewart, W.; International Search Report from corresponding PCT Application No. PCT/CA2019/050200; search completed Apr. 16, 2019.

\* cited by examiner

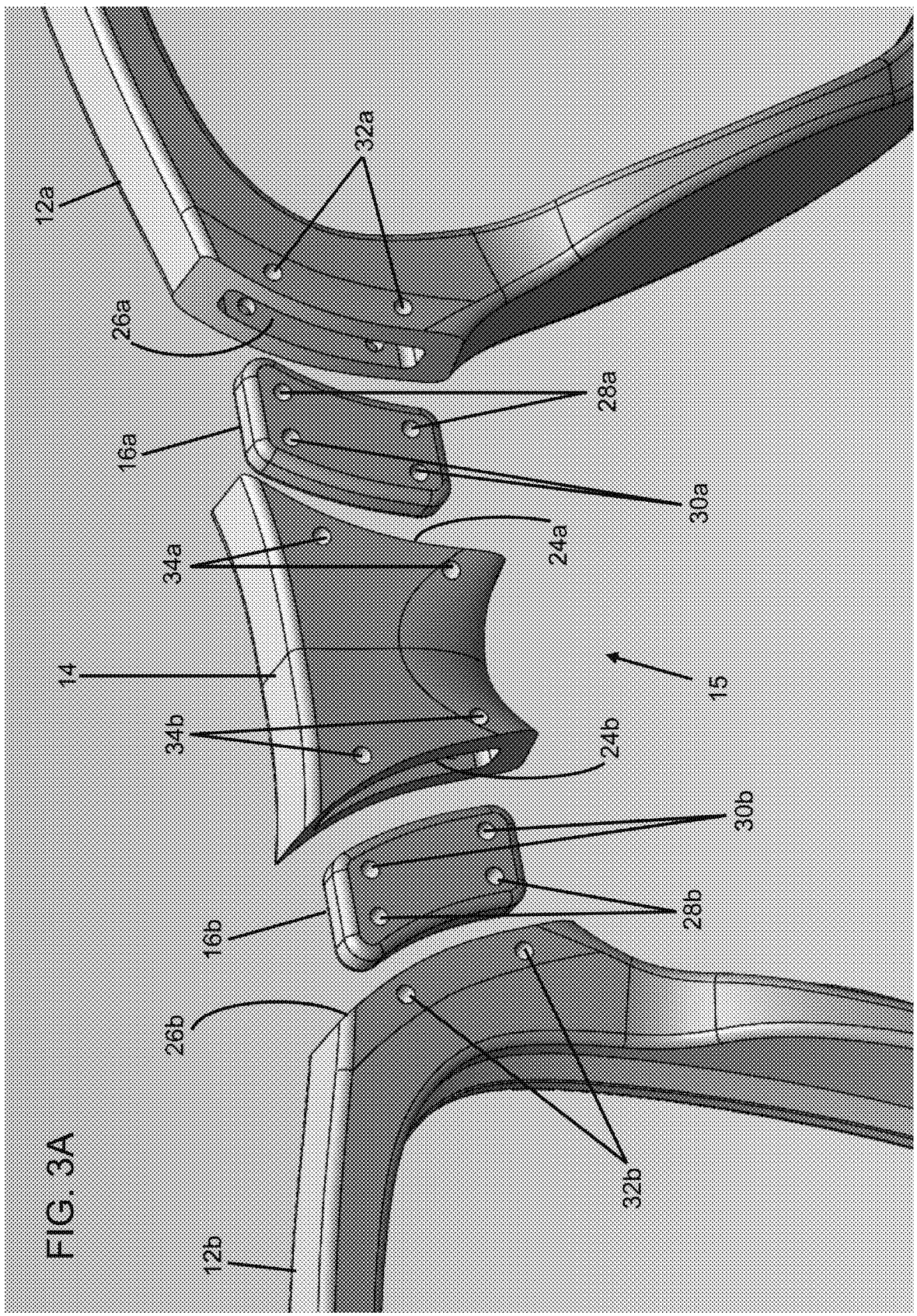

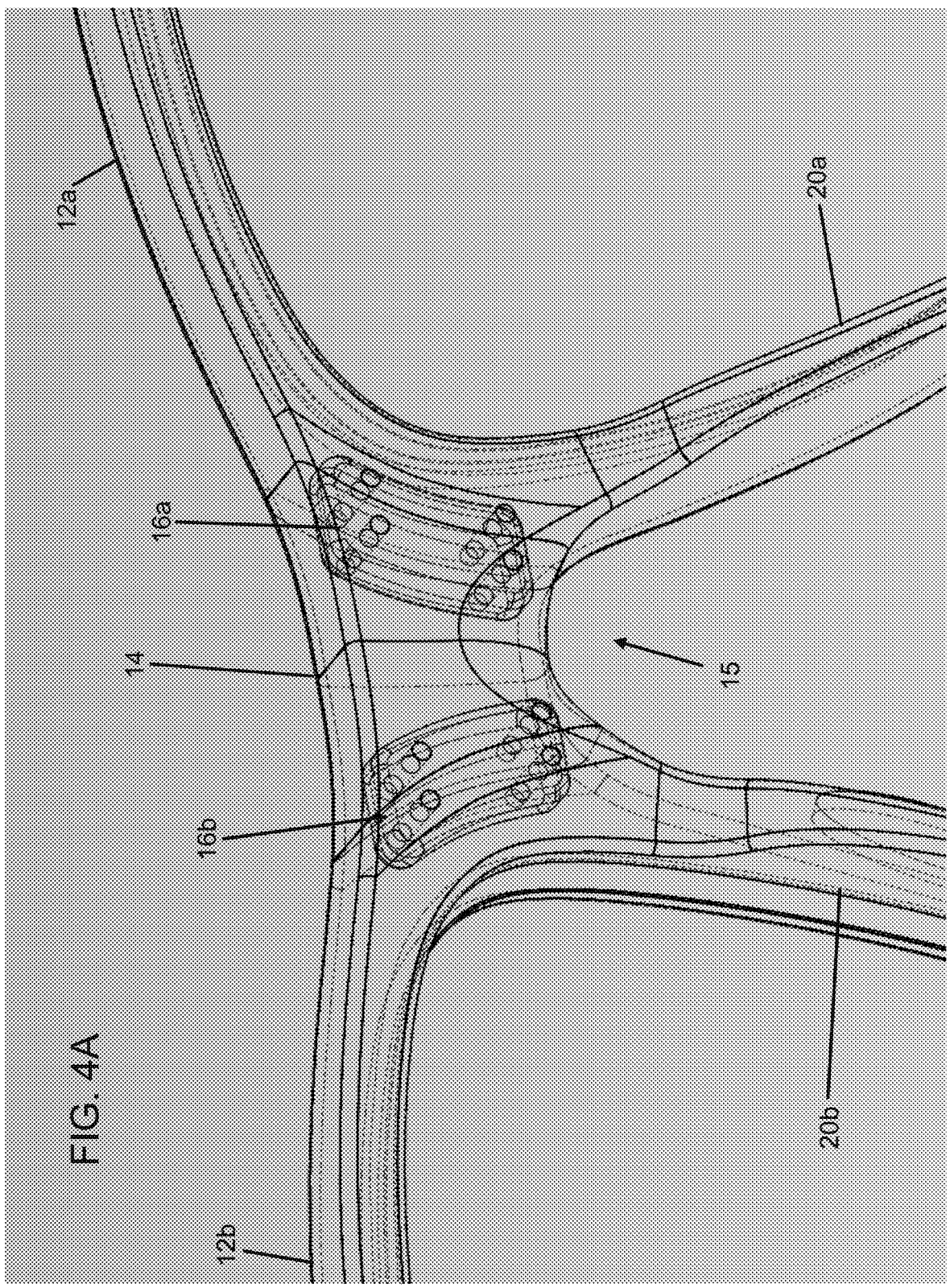

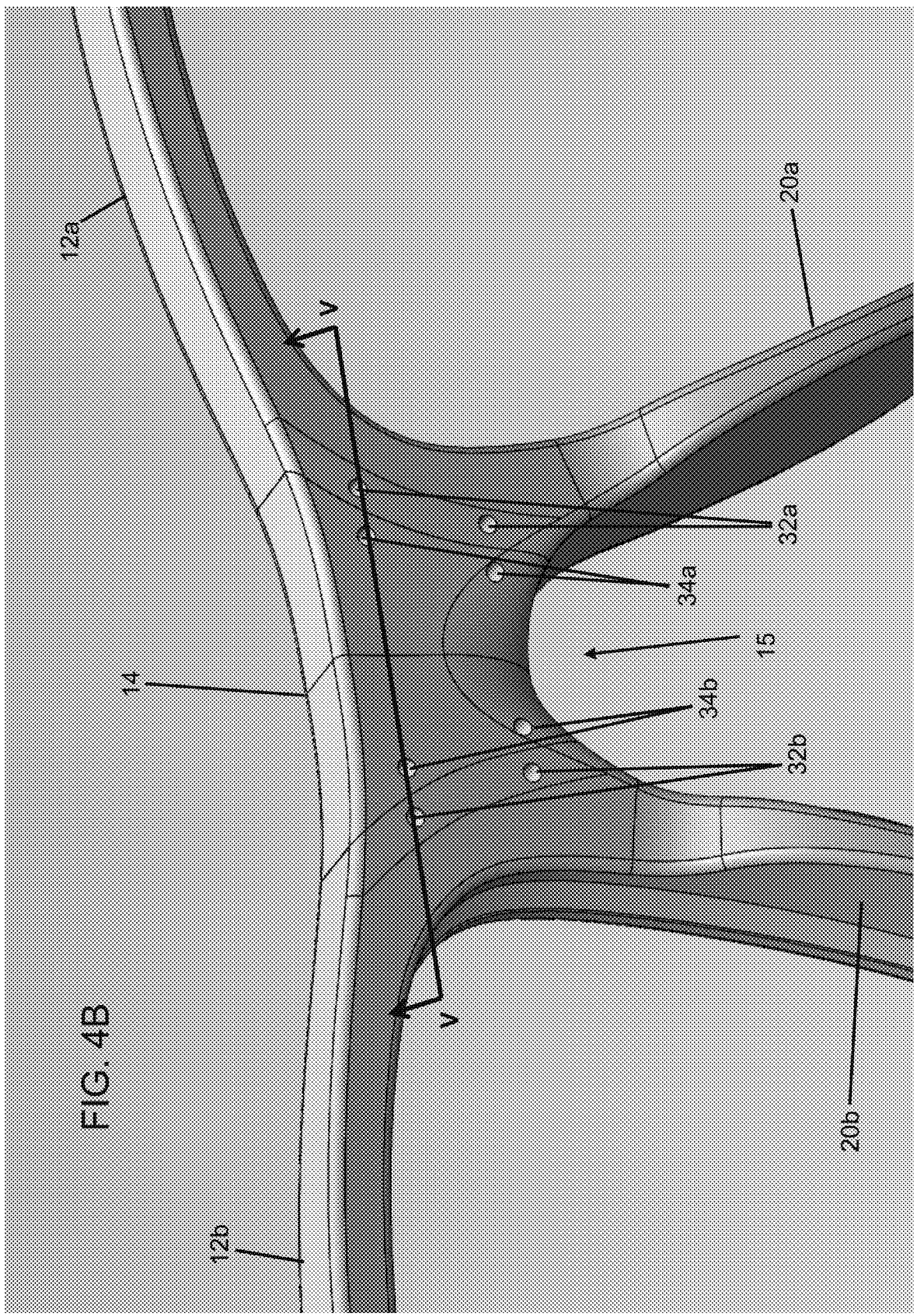

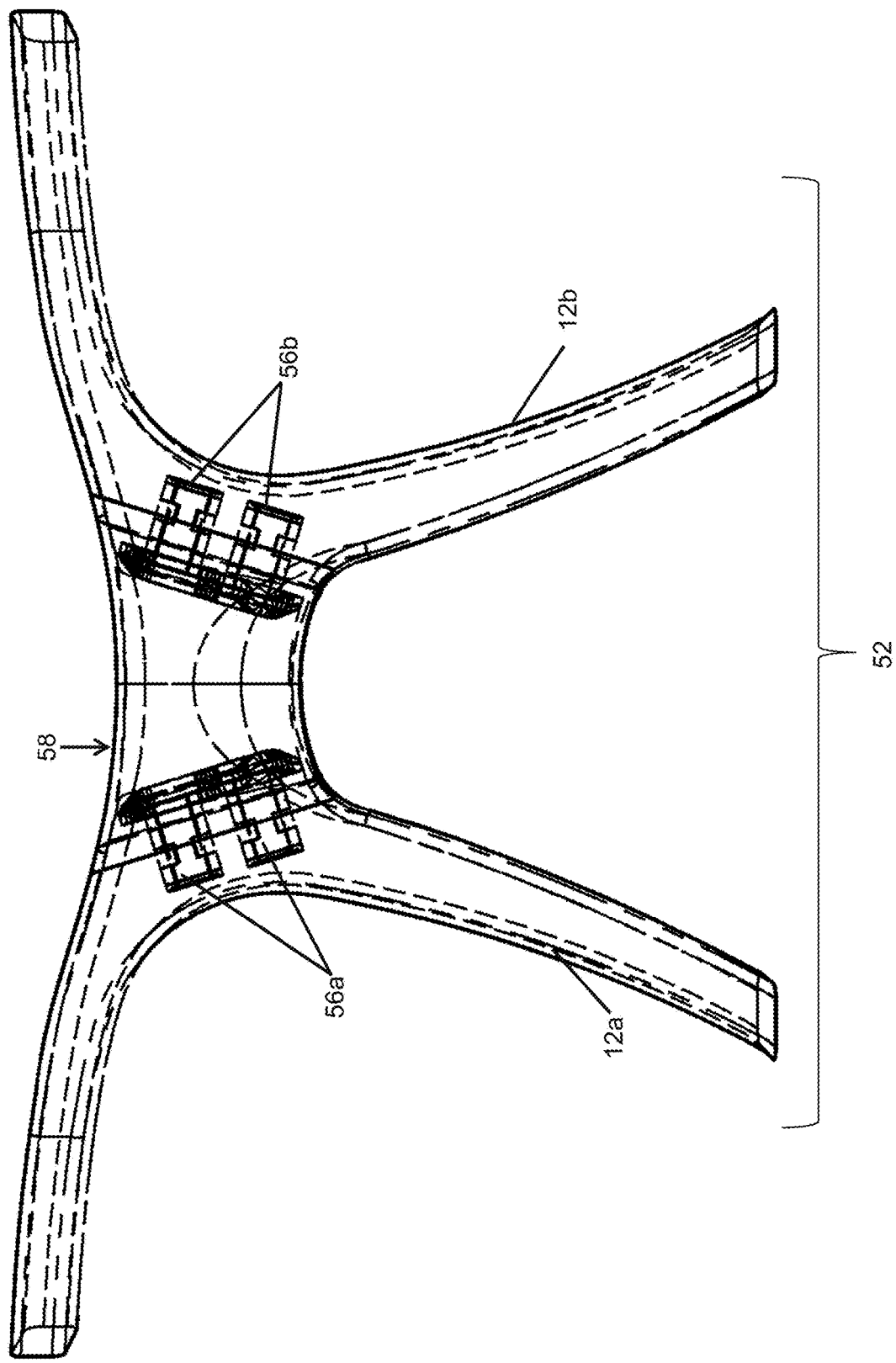

FLEXIBLE BRIDGE ASSEMBLY FOR EYEWEAR AND METHOD OF ASSEMBLING FLEXIBLE EYEWEAR

CROSS-REFERENCE TO RELATED APPLICATION(S)

This application claims the benefit of priority to U.S. Provisional Patent Application No. 62/632,921 filed on Feb. 20, 2018, the contents of which are incorporated herein by reference.

TECHNICAL FIELD

The following relates to flexible bridges for eyewear, and methods of assembling eyewear to incorporate such flexible bridges.

BACKGROUND

Eyewear such as eyeglasses generally include a frame that supports one or more lenses. The frame typically includes a nose bridge or nose pieces that engage the user's nose to support the eyewear on the user's head. Eyeglasses also typically include a pair of arms attached to (or integral with) the frame, to further support the eyeglasses, e.g. by resting the arms on the user's ears or engaging their head in the temple region. Other eyewear may include other support elements such as straps or bands (e.g., in sports goggles).

Eyeglasses have traditionally utilized frames or frame components made from substantially rigid materials such as plastics, metals, or composite materials. The rigidity of these materials supports the lenses in the frames, and substantially maintains the shape of the eyeglasses such that they consistently fit on a user's head as intended. A drawback of this rigidity is that the frames can only typically withstand some flexure and can be prone to breakage or deformation.

Flexible components have been used in eyewear, for example, flexible arms and flexible portions of the eyewear frames. Various challenges can arise in construction, assembly, and use when incorporating flexible elements. For example, the flexibility should not cause the frames to deform and thus lose their shape over time. Other challenges include assembly complexities and costs associated with using multiple different materials. Components made of rigid material and components made of flexible material generally can find difficulties adhering to each other, and may require a joining mechanism that should be easy to assemble while also being durable and provide a strong joint.

It is an object of the following to address at least one of the above-noted disadvantages.

SUMMARY

In one aspect, there is provided a flexible bridge assembly for eyewear comprising: a flexible bridge portion having a first recess at one end, and a second recess at another end; a first rigid attachment member connected at a first end thereof to the first recess; and a second rigid attachment member connected at a first end thereof to the second recess; wherein second ends of the first and second rigid attachment members provide attachment portions for first and second lens retainers of eyewear.

In another aspect, there is provided a flexible bridge assembly for eyewear comprising: a flexible bridge; a first rigid connecting end embedded in the flexible bridge at one end; and a second rigid connecting end embedded in the flexible bridge at the other end; wherein the first and second connecting ends provide attachment portions for joining the flexible bridge assembly to first and second lens retainers of eyewear.

In yet another aspect, there is provided a flexible bridge assembly for eyewear comprising: a first rigid attachment member having at least one prong and at least one slot; a second rigid attachment member having at least one prong and at least one slot; a flexible bridge portion; a first lens retainer having at least one recess; and a second lens retainer having at least one recess; wherein the prongs of the first rigid attachment members provide an attachment portion for the recess of the first lens retainer; and the prongs of the second rigid attachment members provide an attachment portion for the recess of the first lens retainer.

In other aspects, there is provided an eyewear assembly comprising one of the above flexible bridge assemblies.

In an implementation, the rigid attachment members are secured to the flexible bridge by the insertion of a fastener, such as cured resin. In another implementation, the flexible bridge is overmolded over the rigid attachment members.

BRIEF DESCRIPTION OF THE DRAWINGS

Embodiments will now be described with reference to the appended drawings wherein:

FIG. 3*a* is an enlarged partial exploded perspective view of the flexible bridge assembly shown in FIG. 1;

FIG. 4*a* is an enlarged partial perspective view of the flexible bridge assembly shown in FIG. 1, with transparency used to illustrate interior components;

FIG. 4*b* is an enlarged partial perspective view of the flexible bridge assembly shown in FIG. 1;

FIG. 16 is an enlarged partial front view of the flexible bridge assembly shown in FIG. 10, with transparency used to illustrate interior components;

DETAILED DESCRIPTION

To provide flexibility in eyewear such as eyeglasses, sunglasses, safety eyewear and the like; a flexible bridge assembly can be utilized, in which rigid attachment members are at least partially contained or embedded in a flexible body to provide attachment points to lens retainers in the eyewear, with the flexible body therebetween allowing flexibility of the eyewear at or about the bridge area.

Figure 1:
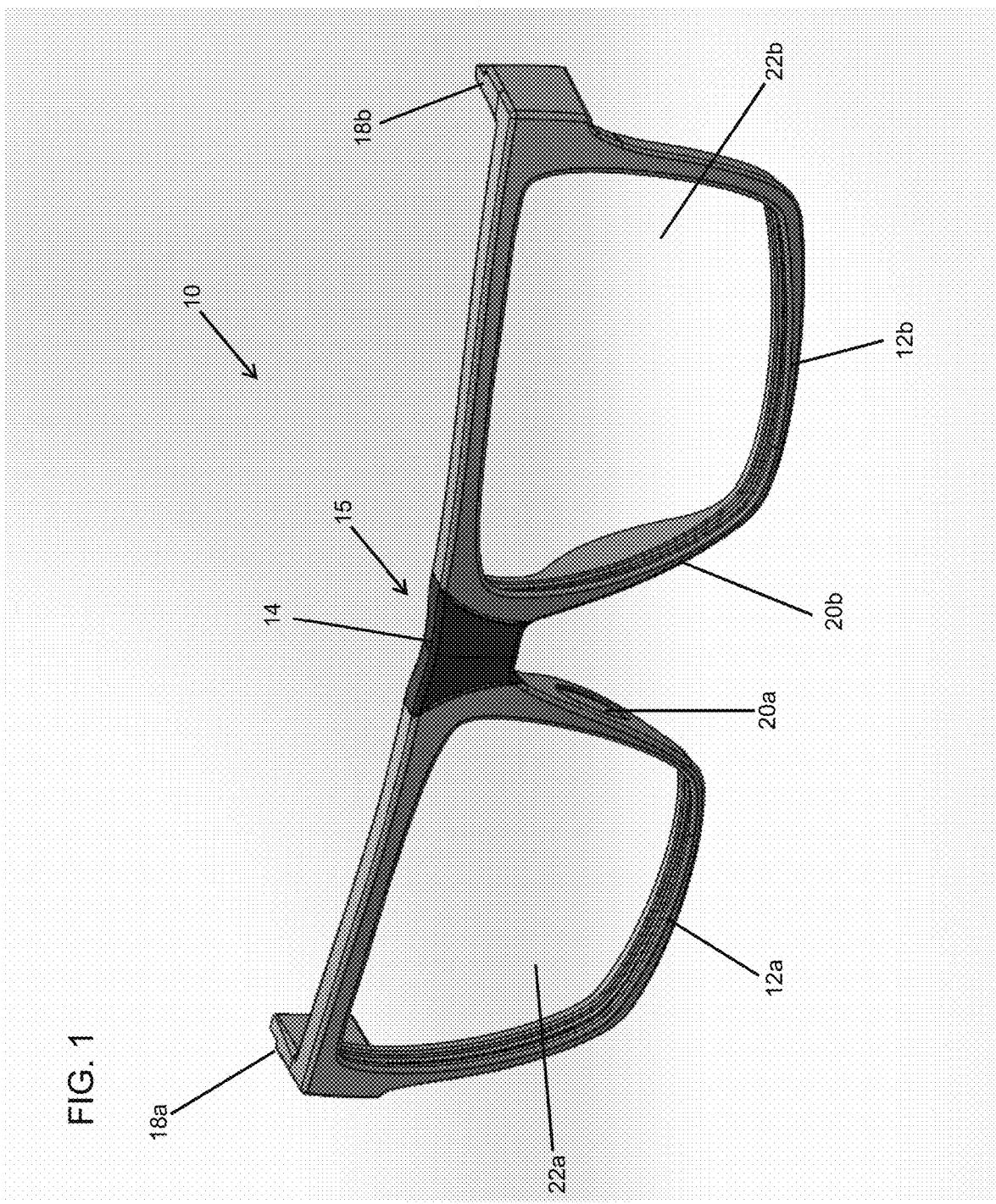
FIG. 1 is a perspective view of eyewear with a flexible bridge assembly.

Turning now to the figures, FIG. 1 provides a perspective view of an assembled eyewear 10, also referred to interchangeably herein as an eyewear assembly 10 or eyewear 10 for brevity. The eyewear 10 includes a pair of separate lens retainers 12, in this example a first lens retainer 12a and a second lens retainer 12b. The lens retainers 12a, 12b may be adapted to hold lenses, specifically in this example a first lens 22a is held by first lens retainer 12a and a second lens 22b is held by second lens retainer 12b. A first arm 18a is connected to the first lens retainer 12a, and a second arm 18b is connected to the second lens retainer 12b. The first lens retainer 12a includes or otherwise supports a first nose piece 20a, and the second lens retainer 12b includes or otherwise supports a second nose piece 20b. The nose pieces 20 may also be referred to as, or considered to be, nose engaging portions or nose pads. Moreover, the nose pieces 20 shown in FIG. 1 are for illustrative purposes only.

The lens retainers 12a and 12b are connected to each other via a flexible bridge assembly 15, which as shown in greater detail below, includes a flexible bridge portion 14, also referred to interchangeably herein as the bridge portion 14. The lens retainers 12a and 12a are connected to the bridge assembly 15 such that they are positioned on either side of the user's head and aligned with their eyes. The flexible bridge assembly 15 enables the eyewear 10 to be flexed such that the lens retainers 12a, 12b and arms 18a, 18b attached thereto can be bent or otherwise separated or twisted relative to each other. This allows, for example, a user to slightly flex the arms 18a, 18b away from each other when placing the eyewear 10 on their head, with resiliency in the flexible bridge portion 14 causing the arms 18a, 18b to return towards each other and seat against the user's head and on their ears. The flexibility also resists breakage of the lens retainers 12a, 12b by permitting them to flex, twist, and to a certain extent, fold, e.g. if the eyewear 10 falls, is sat upon by the user, is stuffed into a purse or bag, etc.

Figure 2:
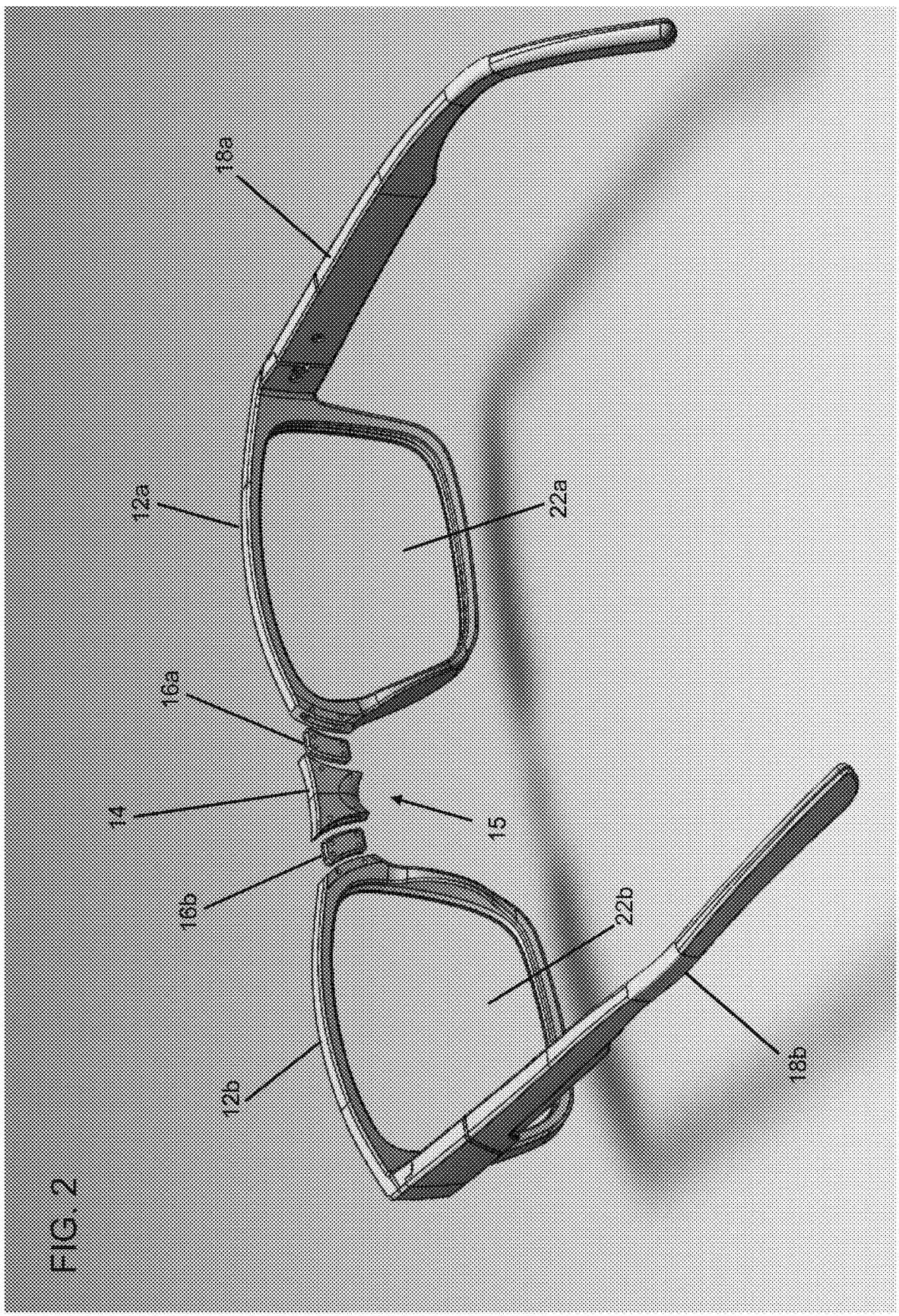
FIG. 2 is an exploded perspective view of the eyewear shown in FIG. 1.

The components of the flexible bridge assembly 15 and the manner in which the assembly 15 connects to the lens retainers 12a, 12b is illustrated in FIG. 2. The flexible bridge portion 14 may be constructed from an elastomer such as thermoplastic polyurethane (TPU), rubber or thermoplastic rubber (TRP), soft plastic, or any other suitable material.

The lens retainers 12a, 12b may be made from plastic, wood, acetate, or another suitable rigid material. The flexible bridge assembly 15 and the lens retainers 12a, 12b are joined to each other using rigid attachment members 16, also referred to interchangeably herein as mounting members 16. The mounting members 16 in this example are relatively thinner than the flexible bridge portion 14 and lens retainers 12, to allow them to be at least partially embedded or contained therein. In this example the first lens retainer 12a is attached to the flexible bridge assembly 15 by a first attachment member 16a, and the second lens retainer 12b is attached to the other side of the flexible bridge assembly 15 by a second attachment member 16b. This effectively couples the first lens retainer 12a to the second lens retainer 12b via the flexible bridge portion 14 to provide the aforementioned flexibility and resiliency. The mounting members 16 may be made metal, carbon fiber, plastic, or any other suitable rigid material.

Figure 3B:
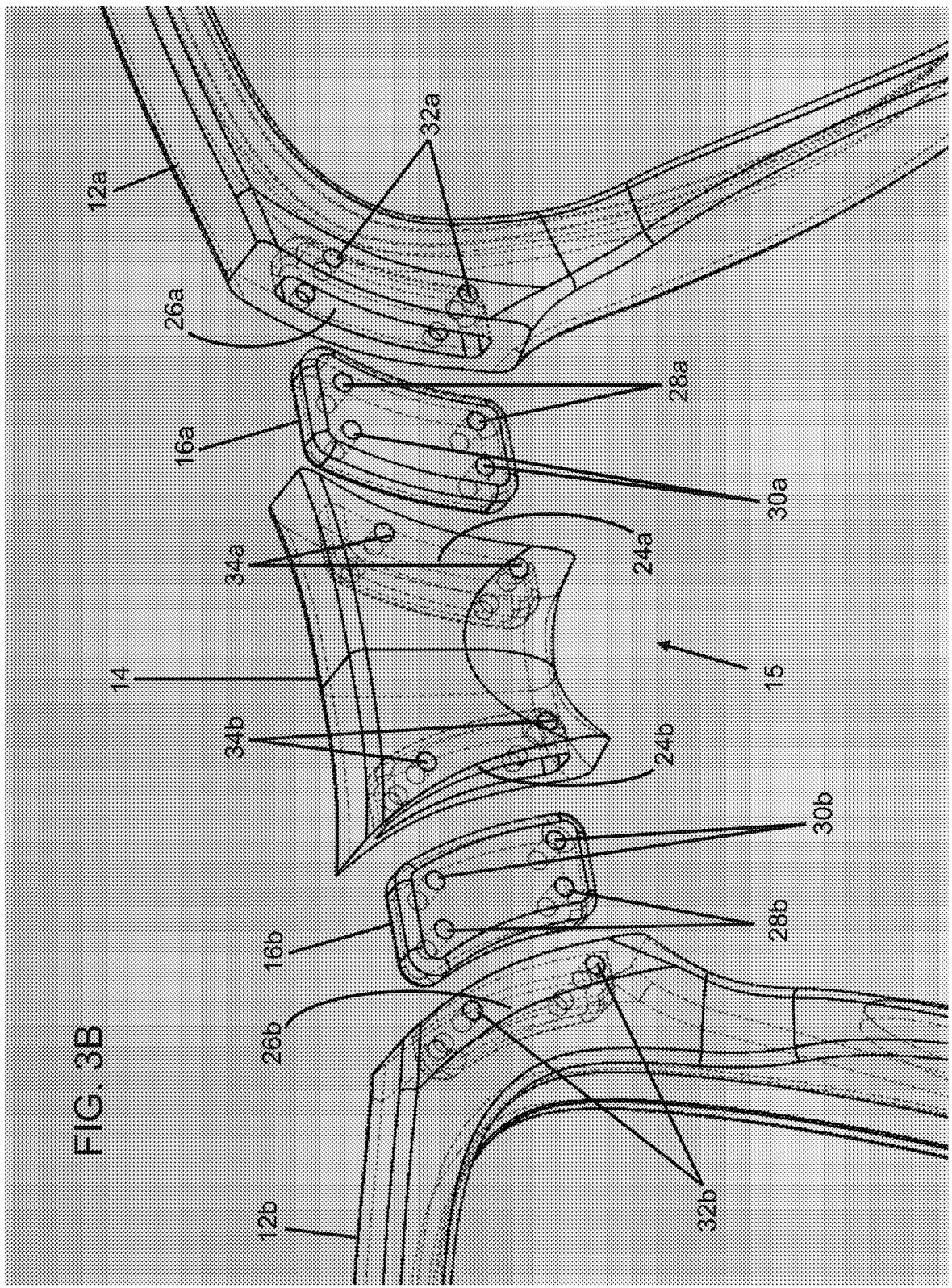
FIG. 3*b* is an enlarged partial exploded perspective view of the flexible bridge assembly shown in FIG. 1, with transparency used to illustrate interior components.

Additional details of the components and manner of assembling the flexible bridge assembly 15 to and with the lens retainers 12a, 12b are apparent from the enlarged exploded partial perspective views illustrated in FIGS. 3a and 3b. It can be observed that the lens retainers 12a, 12b are constructed with slots, notches or recesses 26. The recesses 26 are shaped and contoured to be complementary to the outwardly extending ends of the corresponding attachment members 16 such that the recesses 26 can accept a portion of the mounting members 16a, 16b for attachment thereto. In this example, first lens retainer 12a has a first lens retainer recess 26a, and second lens retainer 12b has a second lens retainer recess 26b. Flexible bridge portion 14 is constructed to include a bridge recess 24 at each end, such that one bridge recess 24 faces each lens retainers 12a, 12b to accept the other end of the attachment members 16. That is, the bridge recesses 24 are sized and contoured to be complementary to and accept the other ends of mounting members 16a, 16b. One end of first mounting member 16a may be inserted into a first bridge recess 24a, and one end of second mounting member 16b may be inserted into a second bridge recess 24b.

In this example, the lens retainers 12 are each provided with one or more lens retainer passages 32 that pass from the rear face of the lens retainers 12a, 12b, through the respective lens retainer recesses 26 and partially through the front face of the lens retainer 12 (i.e. countersunk into the front face). Specifically, in this example, the first lens retainer 12a has a pair of first lens retainer passages 32a and the second lens retainer 12b has a pair of first lens retainer passages 32b. It can be appreciated that any suitable number of passages 32 can be provided. The lens retainer passages 32a, 32b extend to both sides of the lens retainer recesses 26a, 26b to align with passages in the attachment members 16 as described below. Similarly, the flexible bridge portion 14 is provided with a set of one or more bridge passages 34 on both sides thereof, which pass through the respective bridge recesses 24 in a similar manner, in order to align with further passages in the attachment members 16 as described below.

The mounting members 16a, 16b are each provided with a first set of one or more passages 28 on the lens retainer side, and a second set of one or more passages 30 on the flexible bride portion side. It is preferred that there be the same number of lens retainer passages 32 as first set of passages 28, and likewise the same number of bridge passages 34 as second set of passages 30. In this example, the first mounting member 16a has a pair of first passages 28a and a pair of second passages 30a. Similarly, the second mounting member 16b has a pair of its own first passages 28*b* and a pair of its own second passages 30*b*. As can be appreciated from the views shown in FIGS. 3*a* and 3*b*, the sets of passages described above are provided to be in alignment to allow the attachment members 16 to be secured to both the flexible bridge portion 14 and the lens retainers 12 as described in greater detail below.

Turning now to FIGS. 4A and 4B, it can be observed that the eyewear 10 can be assembled by inserting the mounting members 16*a*, 16*b* into both the lens retainer recesses 26*a*, 26*b* at one end, and into the bridge recesses 24*a*, 24*b* at the other end. In this example, mounting members 16*a*, 16*b* are sized and contoured such that when they are inserted into lens retainer recesses 26*a*, 26*b* and bridge recesses 24*a*, 24*b*, the peripheral faces of bridge portion 14 bear against the lens retainers 12*a*, 12*b* to create a contiguous fit between the flexible bridge portion 14 and the lens retainers 12*a*, 12*b*. However, it can be appreciated that the mounting members 16*a*, 16*b* may also be wider such that the peripheral faces of bridge 14 do not directly contact the lens retainers 12*a*, 12*b* and, as such, the contiguous fit is not necessarily required.

Figure 5:
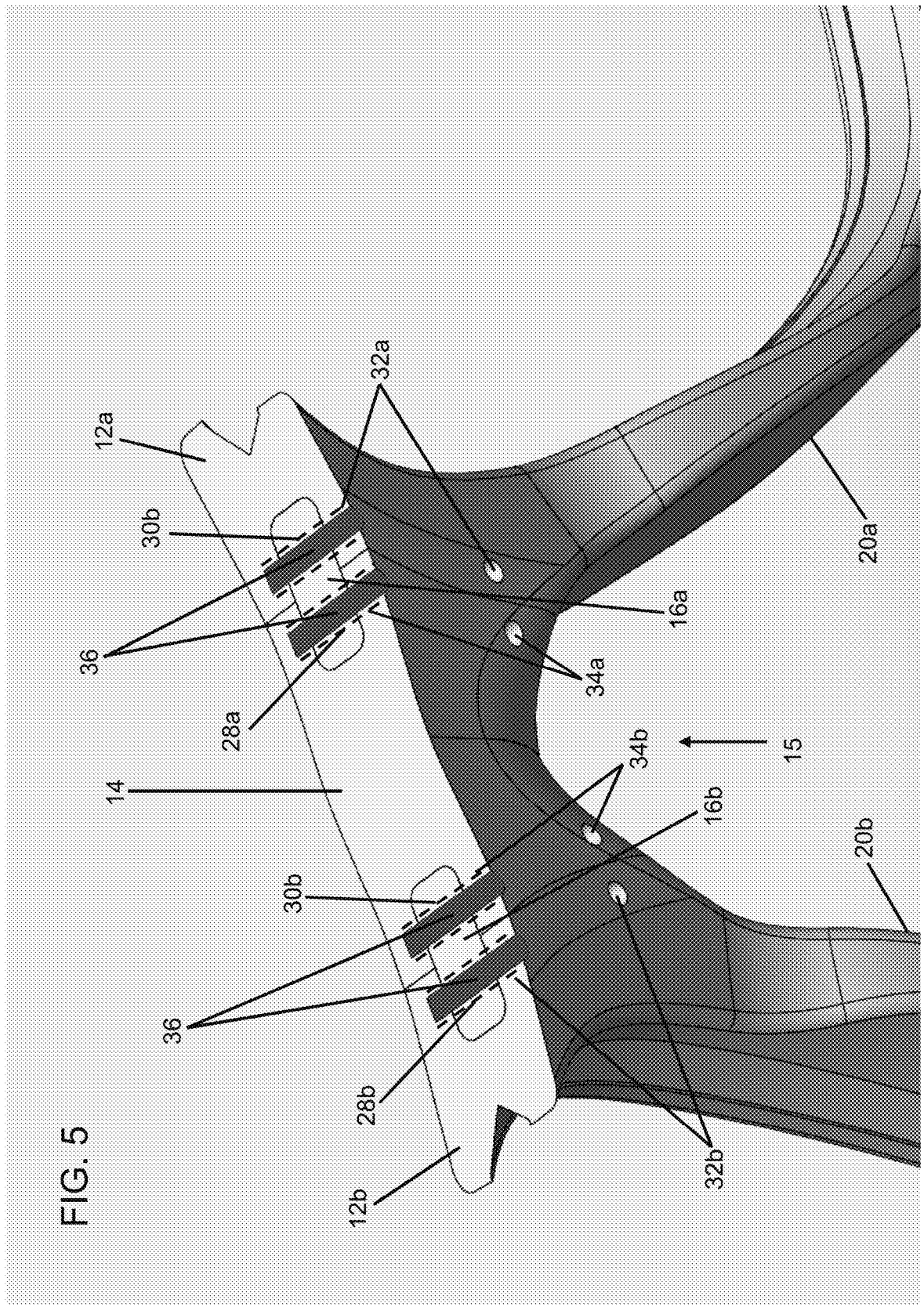
FIG. 5 is a cross-sectional view of the flexible bridge assembly shown in FIG. 4*b* along line V-V.

It can be observed additionally from FIG. 5 that when the first mounting member 16*a* is inserted into the first lens retainer 12*a* and into the flexible bridge portion 14 as described above, the first lens retainer passages 32*a* are aligned with the first set of passages 28*a*, and the first bridge passages 34*a* are aligned with the second set of passages 30*a*. Similarly, when the second mounting member 16*b* is inserted into the second lens retainer 12*b* and into the flexible bridge portion 14 as described above, the second lens retainer passages 32*b* are aligned with the first set of passages 28*b* on the second mounting member 16*b*, and the second bridge passages 34*b* are aligned with the second set of passages 30*b* on the second mounting member 16*b*. These alignments enable the components to be attached to each other.

Figure 6:
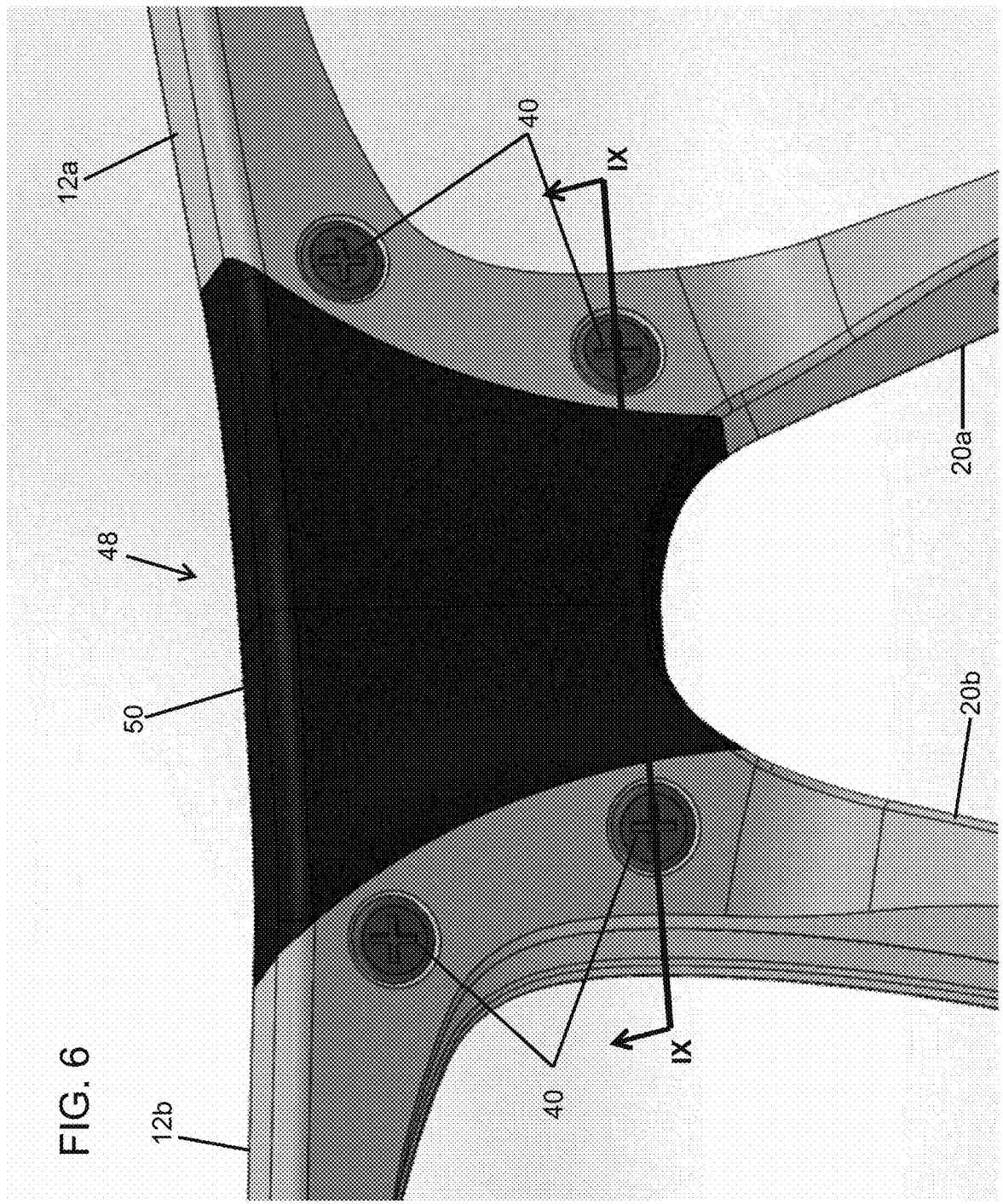
FIG. 6 is an enlarged partial perspective view of a flexible bridge assembly utilizing an alternative fastening mechanism.

Fastening material, or more generally fasteners 36 may be inserted through the aligned passages 28*a* and 32*a*, 28*b* and 32*b*, 30*a* and 34*a*, and 30*b* and 34*b* to join the flexible bridge portion 14 to the lens retainers 12*a*, 12*b* via the mounting members 16*a*, 16*b*. In one implementation, the fasteners 36 are provided by injecting a fastening material such as a resin, which may be poured or otherwise introduced into the aligned passages 28*a* and 32*a*, 28*b* and 32*b*, 30*a* and 34*a*, and 30*b* and 34*b* after assembly of the bridge 14, lens retainers 12*a*, 12*b*, and mounting members 16*a*, 16*b*, then hardened or set. The fasteners 36 may then be buffed or polished such that they are flush with the bridge portion 14 and surfaces of the lens retainers 12 for aesthetic purposes. In an alternate embodiment, fasteners 36 may be screws (e.g., as seen in FIG. 6), dowels, adhesive, rivets or any suitable fastening device.

FIGS. 6 through 9 illustrate another implementation of the flexible bridge assembly denoted by numeral 48. In this implementation, a flexible bridge portion 50 is created by overmolding a flexible material onto connecting ends, as described in greater detail below. This forms a bridge assembly 48 which can be attached to lens retainers 12*a*, 12*b* by fasteners 40, such as the screws shown in FIG. 6.

Figure 7:
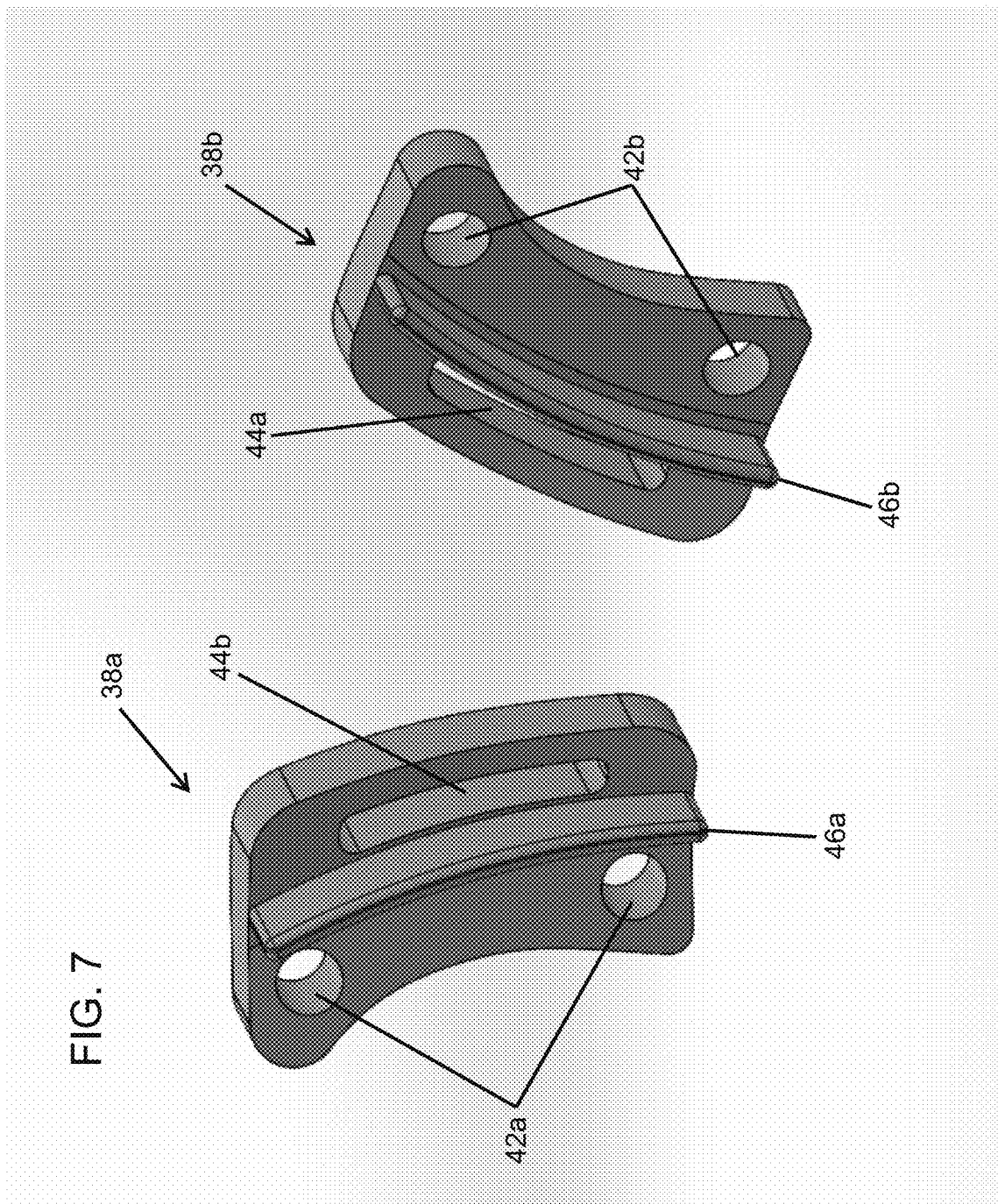
FIG. 7 is a perspective view of the mounting members used in the flexible bridge assembly of FIG. 6, shown in isolation.

The connecting ends 38 used to join the overmolded flexible bridge portion 50 to the lens retainers 12*a*, 12*b* are shown in FIG. 7. In this example, a first connecting end 38*a* joins the first lens retainer 12*a* to the overmolded bridge portion 50, and a second connecting end 38*b* joins the second lens retainer 12*b* to the overmolded bridge portion 50. The connecting ends 38*a*, 38*b* are made from a rigid material to provide stability and support for the eyewear 10 when the overmolded bridge 48 is attached to the lens retainers 12*a*, 12*b*. The connecting ends 38*a*, 38*b* may be made from metal by machining or stamping, or from polymers such as polycarbonate. It should be apparent that any other rigid material may also be used to form the connecting ends 38*a*, 38*b* using methods commonly used in the art.

Figure 9:
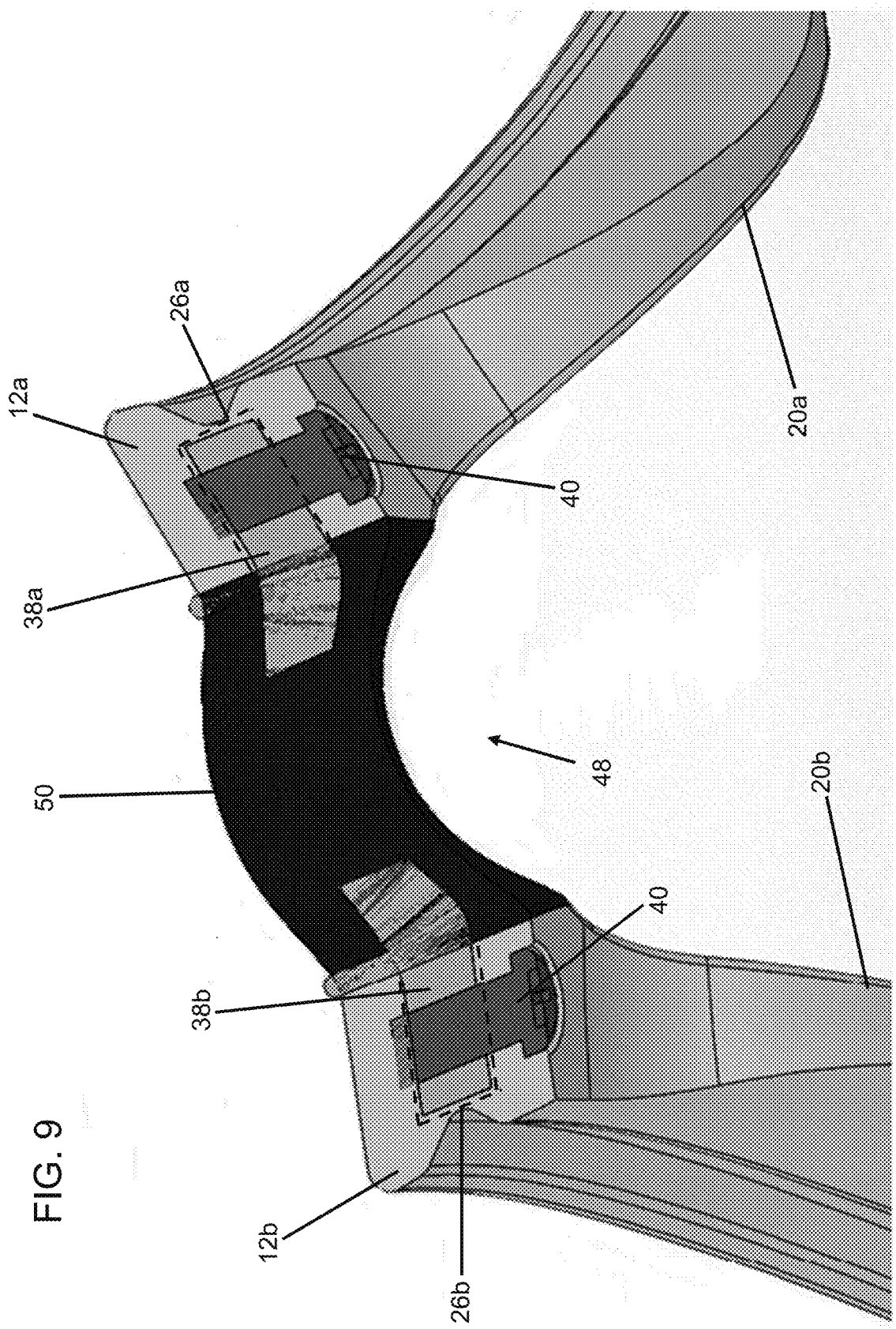
FIG. 9 is a cross-sectional view of the flexible bridge assembly shown in FIG. 6 along line IX-IX.
Figure 10:
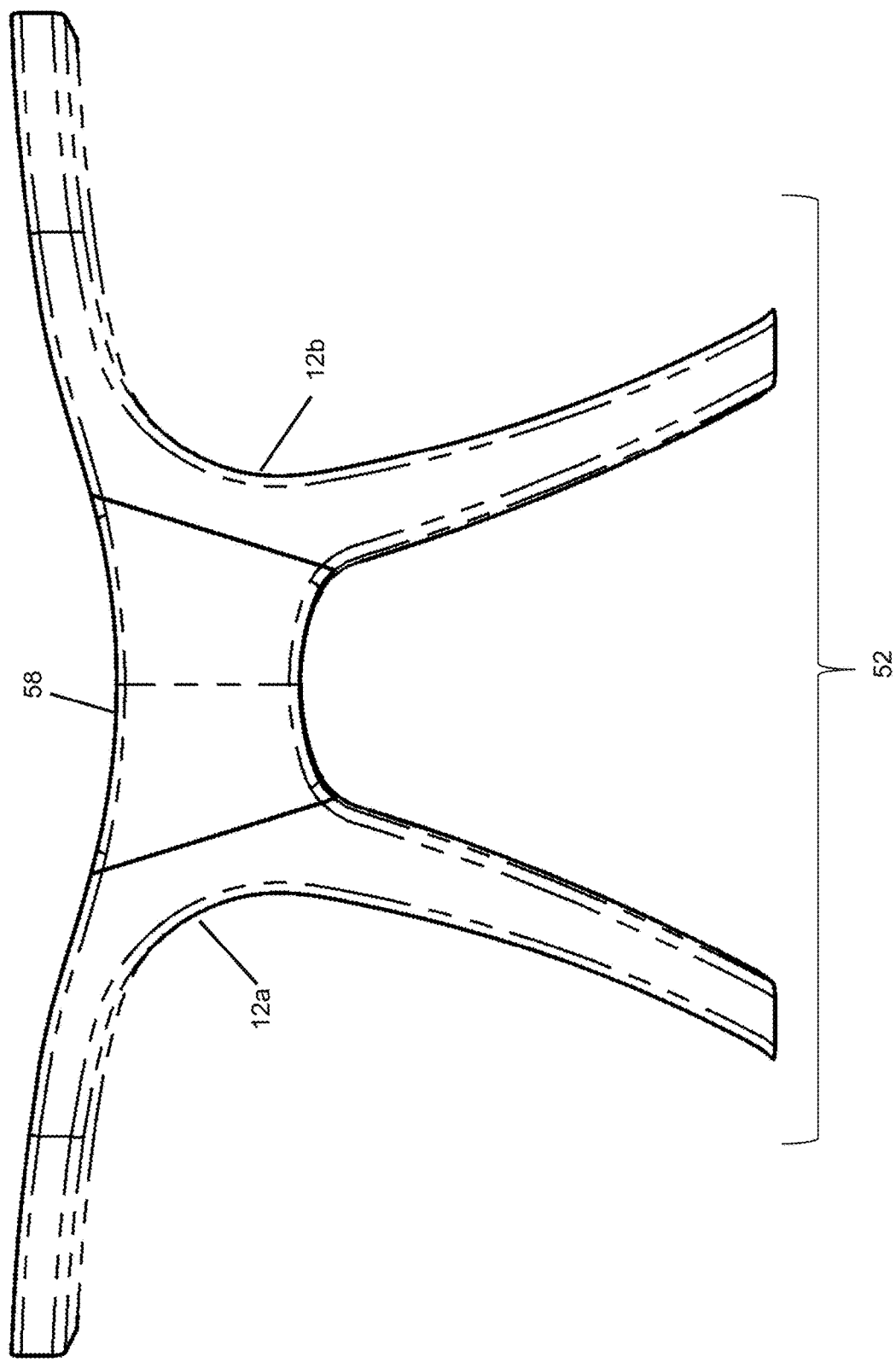
FIG. 10 is an enlarged partial perspective view of a flexible bridge assembly utilizing an alternative connection mechanism.

One side of the connecting ends 38 may be provided with one or more slots 44 (or other passages) for receiving material during the overmolding process, as described in detail below. In this example, the first connecting end 38*a* is provided with an elongated slot 44*a*, and the second connecting end 38*b* is provided with an elongated slot 44*b*. The connecting ends 38 may also be provided with attachment passages 42, which may be threaded for receiving a screw. In this example, the first connecting end 38*a* is provided with two first attachment passages 42*a*, and the second connecting end 38*b* is provided with two second attachment passages 42*b*. The slots 44*a*, 44*b* and attachment passages 42*a*, 42*b* may be separated by ridges 46. In this example, first connecting end 38*a* is provided with first ridge 46*a* on one face, and second connecting end 38*b* is provided with second ridge 46*b* on one face. The ridges 46*a*, 46*b* can be provided for stability when brought against the lens retainers 12*a*, 12*b* as shown in FIG. 9.

Figure 8:
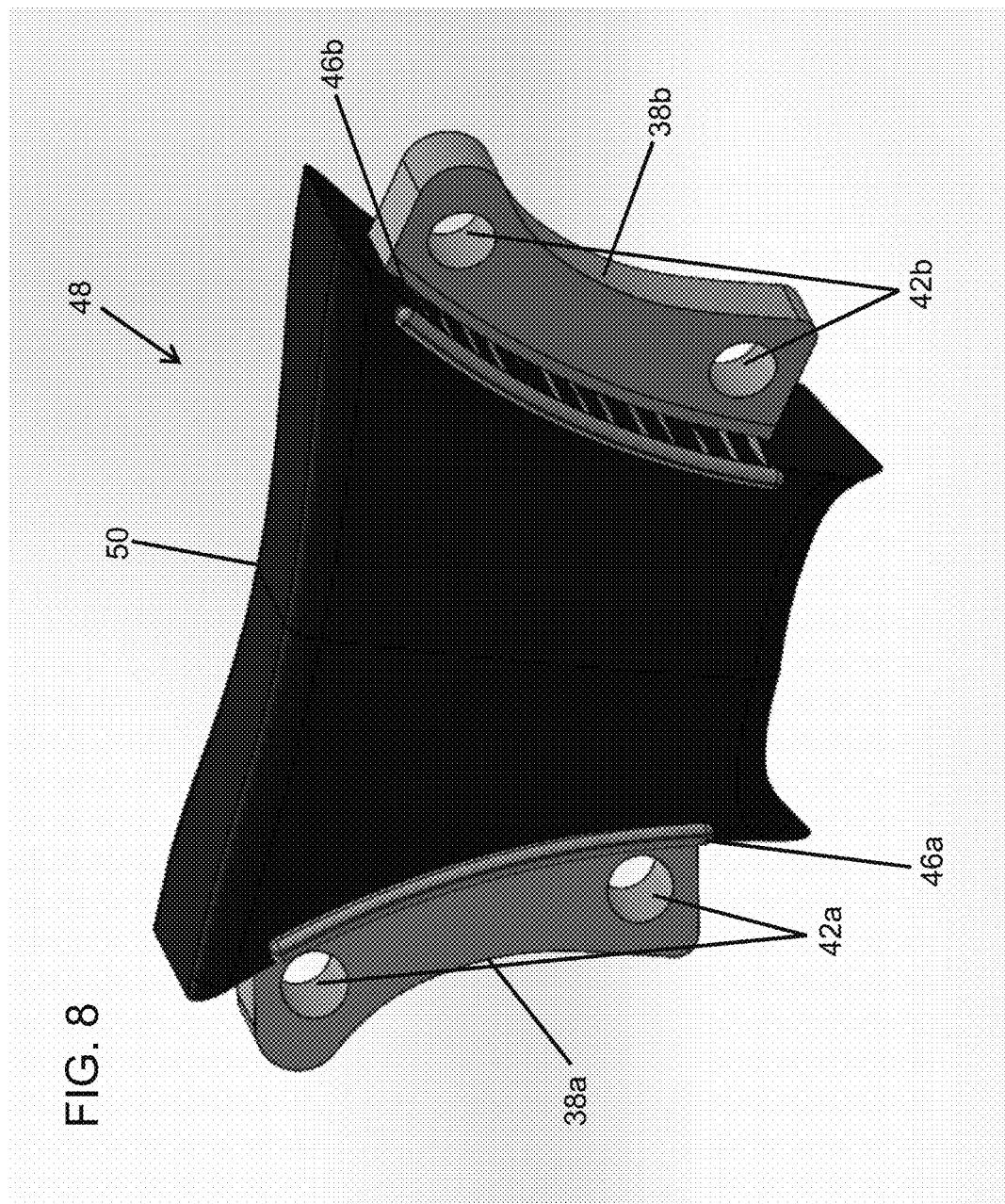
FIG. 8 is a perspective view of the flexible bridge assembly of FIG. 6, shown in isolation.

The material that forms the overmolded bridge portion 50 can be overmolded on the connecting ends 38*a*, 38*b* to create the flexible bridge assembly 48 that can then be joined to the lens retainers 12*a*, 12*b* in constructing the eyewear 10, as illustrated in FIG. 8. The construction of the flexible bridge assembly 48 can be done using any suitable overmolding process. Overmolding, sometimes referred to as two times injection molding, is a process where a single part is created using two or more different materials in combination. Typically, the first material (or substrate) is partially or fully covered by overmolded material during the manufacturing process. In this case, a portion of the connecting ends 38*a*, 38*b* act as the substrate that is overmolded with the material used to create the overmolded bridge 50.

The overmolded material is generally an elastomer such as thermoplastic polyurethane (TPU), rubber or thermoplastic rubber (TRP), soft plastic, or any other suitable material. The material may be molded such that peripheral faces of the overmolded bridge 50 at least partially bear against the raised ridges 46*a*, 46*b*. It can be appreciated that the flexible material would typically be overmolded to the connecting ends 38*a*, 38*b* prior to attaching the bridge assembly 48 to the lens retainers 12*a*, 12*b*. That is, the bridge assembly 48 is preferably constructed as a separate component that is incorporated into the assembly process.

It can be observed from FIG. 7 that the connecting ends 38*a*, 38*b* can be provided with the one or more slots 44*a*, 44*b* for the overmolding process. The material of the overmolded bridge 50 may flow through the slots 44*a*, 44*b* during the overmolding process and fill those slots 44*a*, 44*b* to provide additional gripping and encapsulation of connecting ends 38*a*, 38*b*, forming a stronger hold between the overmolded bridge portion 50 and the connecting ends 38*a*, 38*b*. It can be appreciated that the elongated slots 44*a*, 44*b* are shown in FIG. 7 for illustrative purposes only and any one or more slots or holes of any geometry can be used.

FIGS. 6 and 9 show that the eyewear 10 may be assembled by inserting the connecting ends 38*a*, 38*b* of bridge assembly 48 into the lens retainer recesses 26*a*, 26*b* of lens retainers 12*a*, 12*b*, aligning lens retainer passages 32*a*, 32*b* with attachment passages 42*a*, 42*b* similar to the first implementation described above. Fasteners 40 may be inserted into attachment passages 42*a*, 42*b* through lens retainer passages 32*a*, 32*b* to secure connecting ends 38*a*, 38b in place, thereby joining overmolded flexible bridge portion 50 to the lens retainers 12a, 12b. In this example, the fasteners 40 are screws and attachment passages 42 are threaded to hold fasteners 40. However, it can be appreciated that other fasteners and fastening techniques and mechanisms can be utilized.

FIGS. 10 through 16 illustrate another implementation of the flexible bridge assembly denoted by numeral 52. In this implementation, a flexible bridge portion 58 is created by overmolding a flexible material onto connecting ends 54, as described in greater detail below. This forms a bridge assembly 52 which can be attached to lens retainers 12a, 12b.

Figure 11:
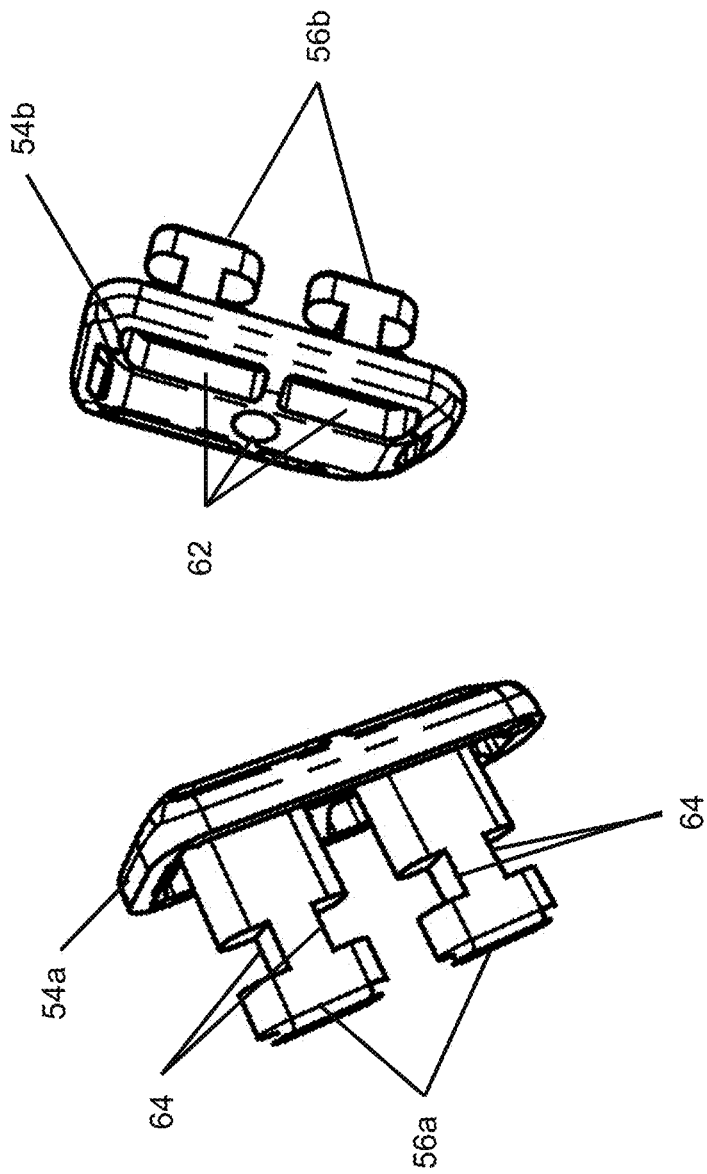
FIG. 11 is a perspective view of the mounting members used in the flexible bridge assembly of FIG. 10, shown in isolation.

The connecting ends 54 can be used to join the overmolded flexible bridge portion 50 to the lens retainers 12a, 12b. In this example, at least one prong 56a protrudes from first connecting end 54a and joins the first lens retainer 12a to the overmolded bridge portion 58, and at least one prong 56b protrudes from second connecting end 54b and joins the second lens retainer 12b to the overmolded bridge portion 58. This embodiment is shown in FIG. 11. The connecting ends 54a, 54b are made from a rigid material to provide stability and support for the eyewear 10 when the overmolded bridge 58 is attached to the lens retainers 12a, 12b. The connecting ends 54a, 54b may be made from metal by machining or stamping, or from polymers such as polycarbonate. It should be apparent that any other rigid material may also be used to form the connecting ends 54a, 54b using methods commonly used in the art.

One side of the connecting ends 54 may be provided with one or more passages 62 for receiving material during the overmolding process, as described in detail below.

Figure 12:
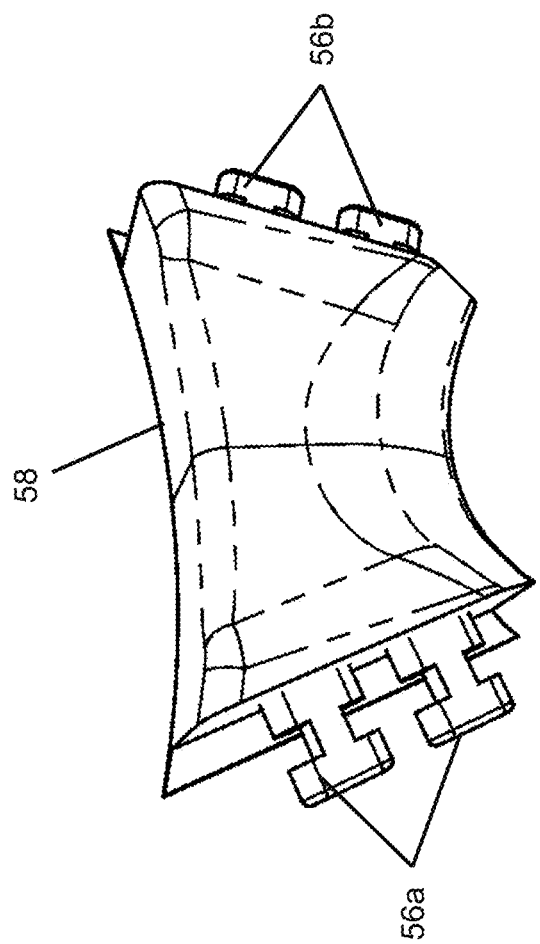
FIG. 12 is a perspective view of the flexible bridge assembly of FIG. 10, shown in isolation.
Figure 13:
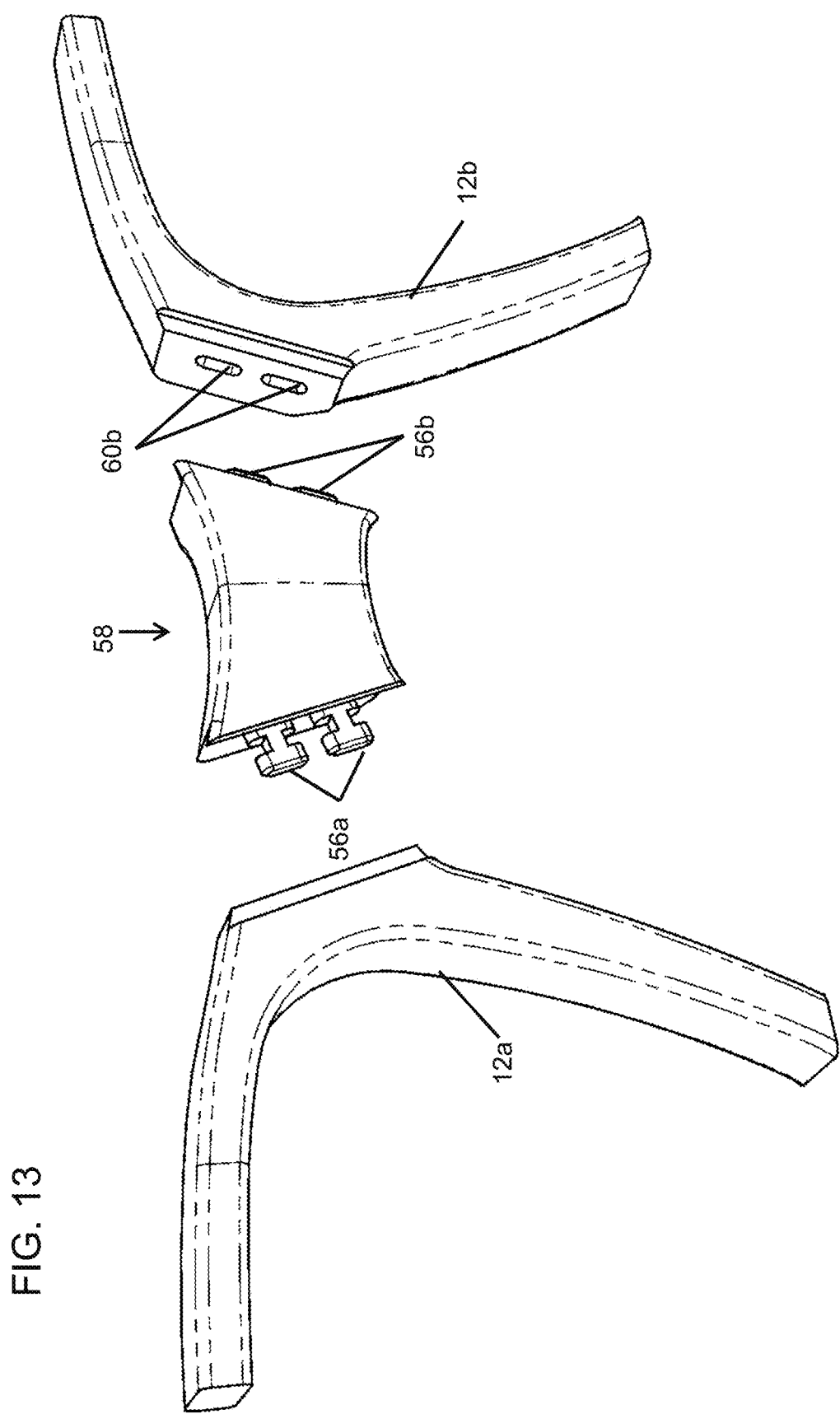
FIG. 13 is an exploded partial perspective view of the flexible bridge assembly of FIG. 10.

The material that forms the overmolded bridge portion 58 can be overmolded on the connecting ends 54a, 54b to create the flexible bridge assembly 48 that can then be joined to the lens retainers 12a, 12b in constructing the eyewear 10, as illustrated in FIGS. 12 and 13. The construction of the flexible bridge assembly 52 can be done using any suitable overmolding process. In this case, a portion of the connecting ends 54a, 54b act as the substrate that is overmolded with the material used to create the overmolded bridge 58. The prongs 56 may also act as the substrate that is overmolded.

The overmolded material is generally an elastomer such as thermoplastic polyurethane (TPU), rubber or thermoplastic rubber (TRP), soft plastic, or any other suitable material. It can be appreciated that the flexible material would typically be overmolded to the connecting ends 54a, 54b prior to attaching the bridge assembly 52 to the lens retainers 12a, 12b. That is, the bridge assembly 52 is preferably constructed as a separate component that is incorporated into the assembly process.

It can be observed from FIGS. 11 and 12 that the connecting ends 54a, 54b can be provided with the one or more passages 62 for the overmolding process. The material of the overmolded bridge 58 may flow through the passages 62 during the overmolding process and fill those passages 62 to provide additional gripping and encapsulation of connecting ends 54a, 54b, forming a stronger hold between the overmolded bridge portion 58 and the connecting ends 54a, 54b. It can be appreciated that the elongated passages 62 are shown in FIG. 11 for illustrative purposes only and any one or more slots or holes of any geometry can be used. FIG. 12 illustrates an embodiment of the connecting ends 54a, 54b, which are overmolded to form the overmolded bridge 58.

The prongs 56 may include notches 64 for securing the flexible bridge portion 50 to the lens retainers 12. One side of the lens retainer 12a may be provided with slots 60a for receiving the prongs 56a and one side of the lens retainer 12b may be provided with slots 60b for receiving the prongs 56b; as illustrated in FIG. 13.

Fasteners such as screws may also be used to join the flexible bridge assembly 50 to the lens retainers 12. The flexible bridge assembly 50 and lens retainers 12 may include passages which align such that the fasteners are inserted, the aligned passages join the flexible bridge assembly 50 to the first and second lens retainers 12a, 12b.

Figure 14:
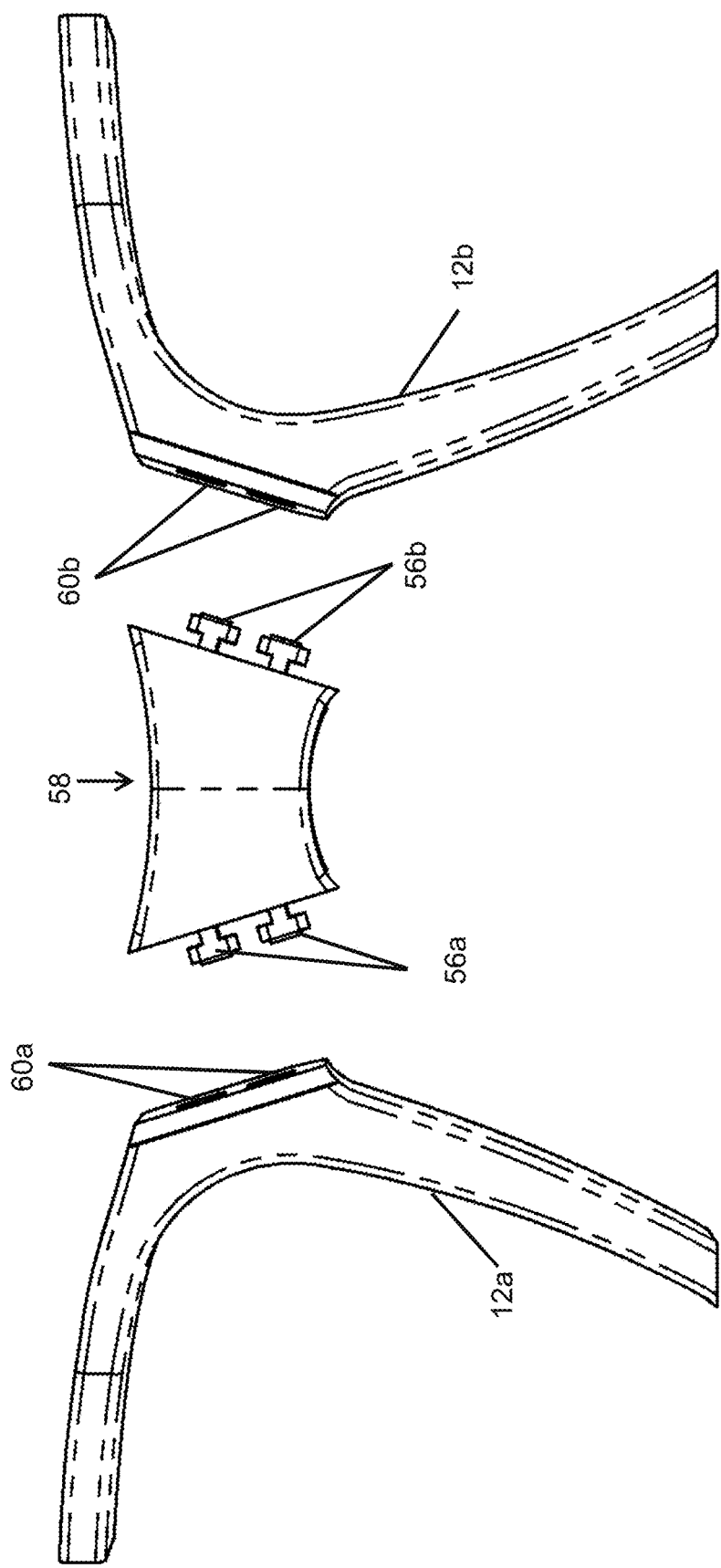
FIG. 14 is an exploded partial front view of the flexible bridge assembly of FIG. 10.
Figure 15:
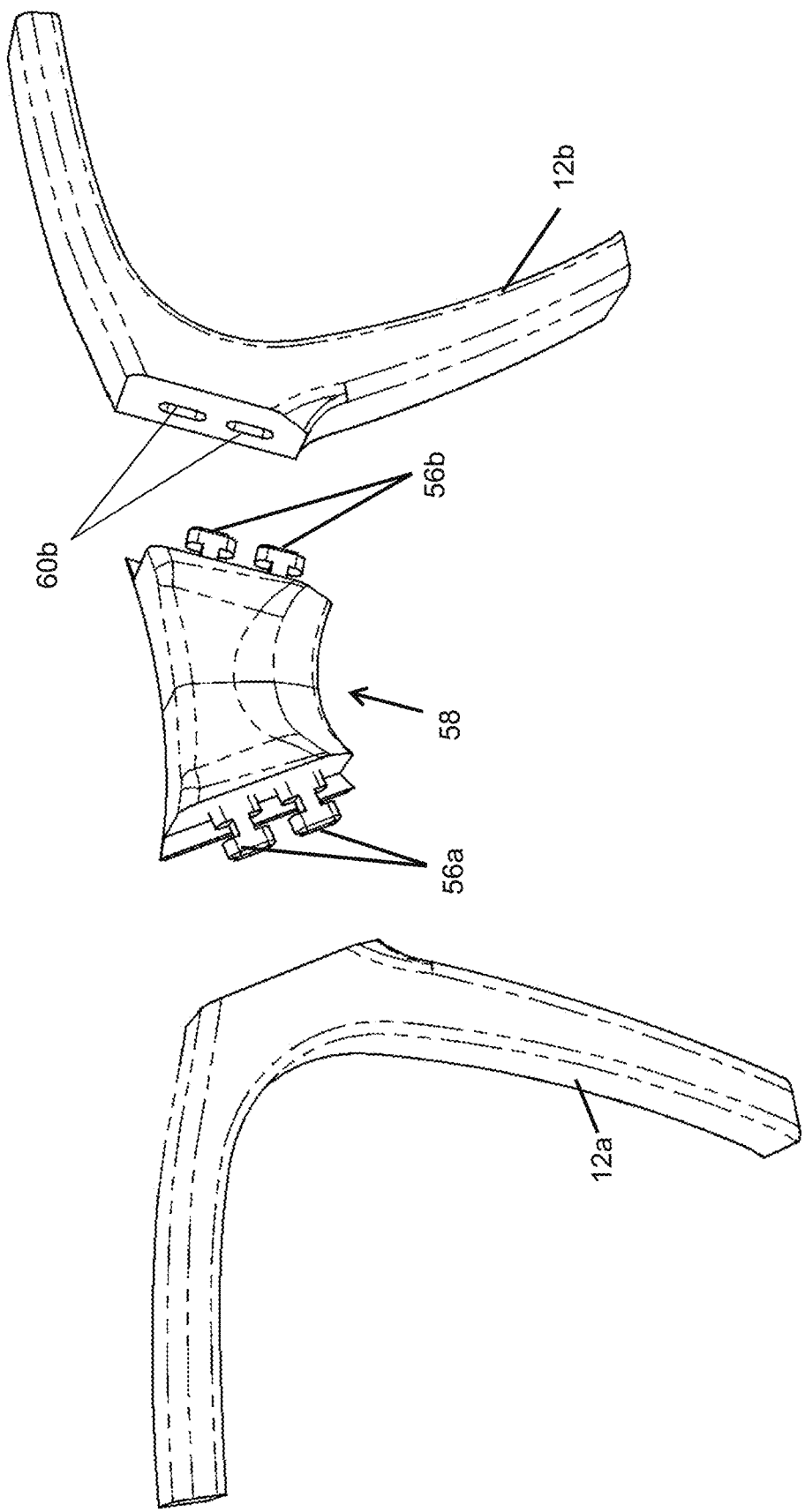
FIG. 15 is an exploded partial front view of the flexible bridge assembly of FIG. 10.
Figure 17A:
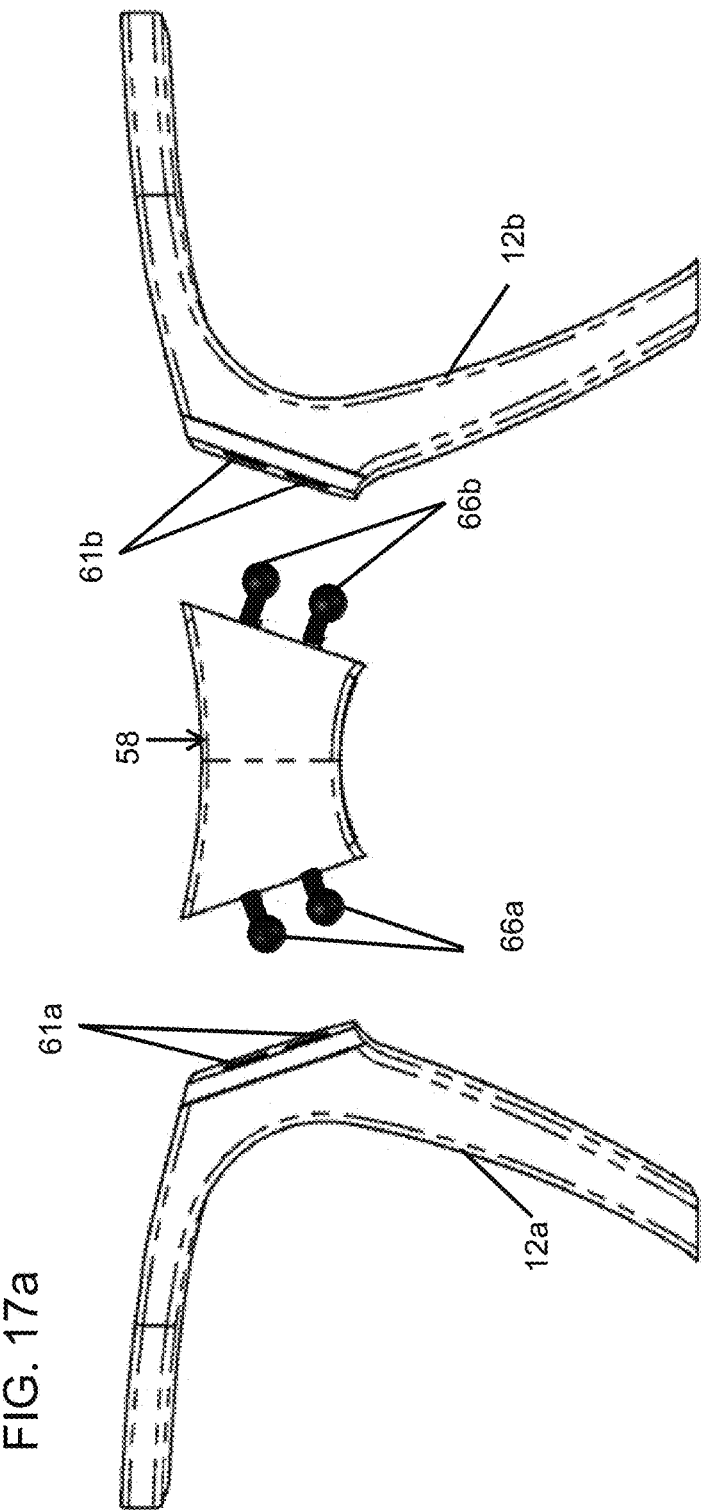
FIG. 17a is an exploded partial front view of the flexible bridge assembly utilizing an alternative prong design.
Figure 17B:
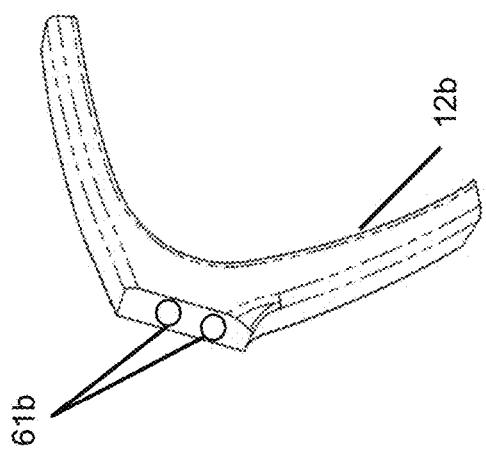
FIG. 17b is an exploded partial perspective view of the lens retainer utilizing an alternative recess design.
Figure 18:
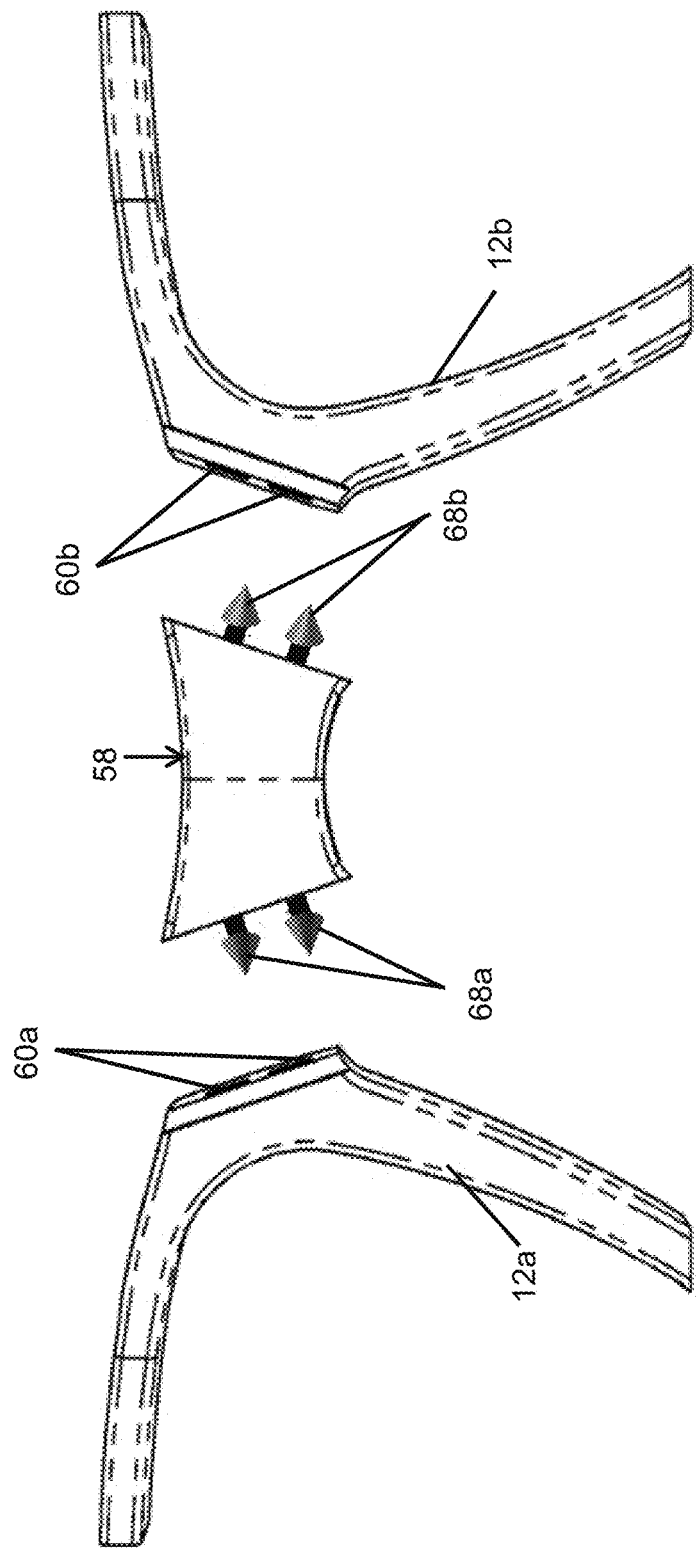
FIG. 18 is an exploded partial front view of the flexible bridge assembly utilizing another alternative prong design.
Figure 19:
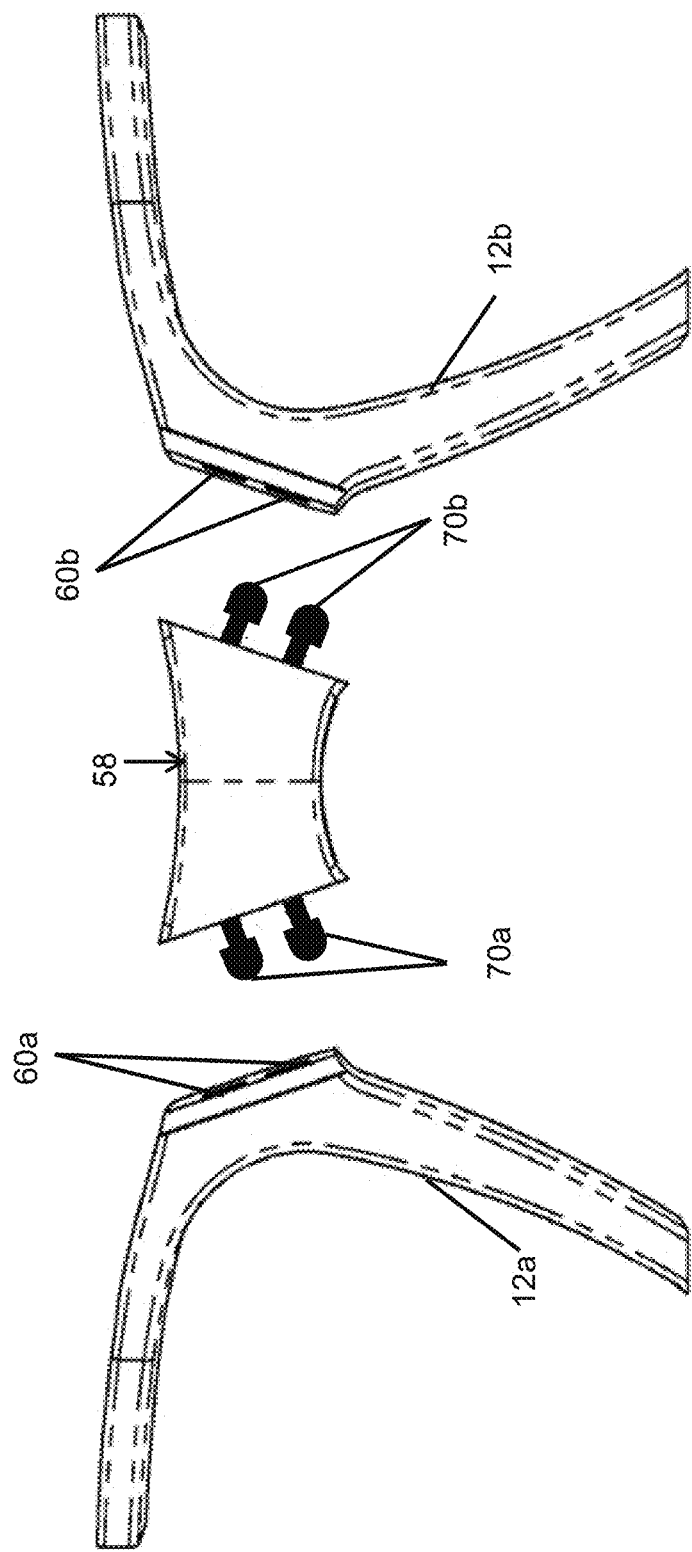
FIG. 19 is an exploded partial front view of the flexible bridge assembly utilizing yet another alternative prong design.
Figure 20:
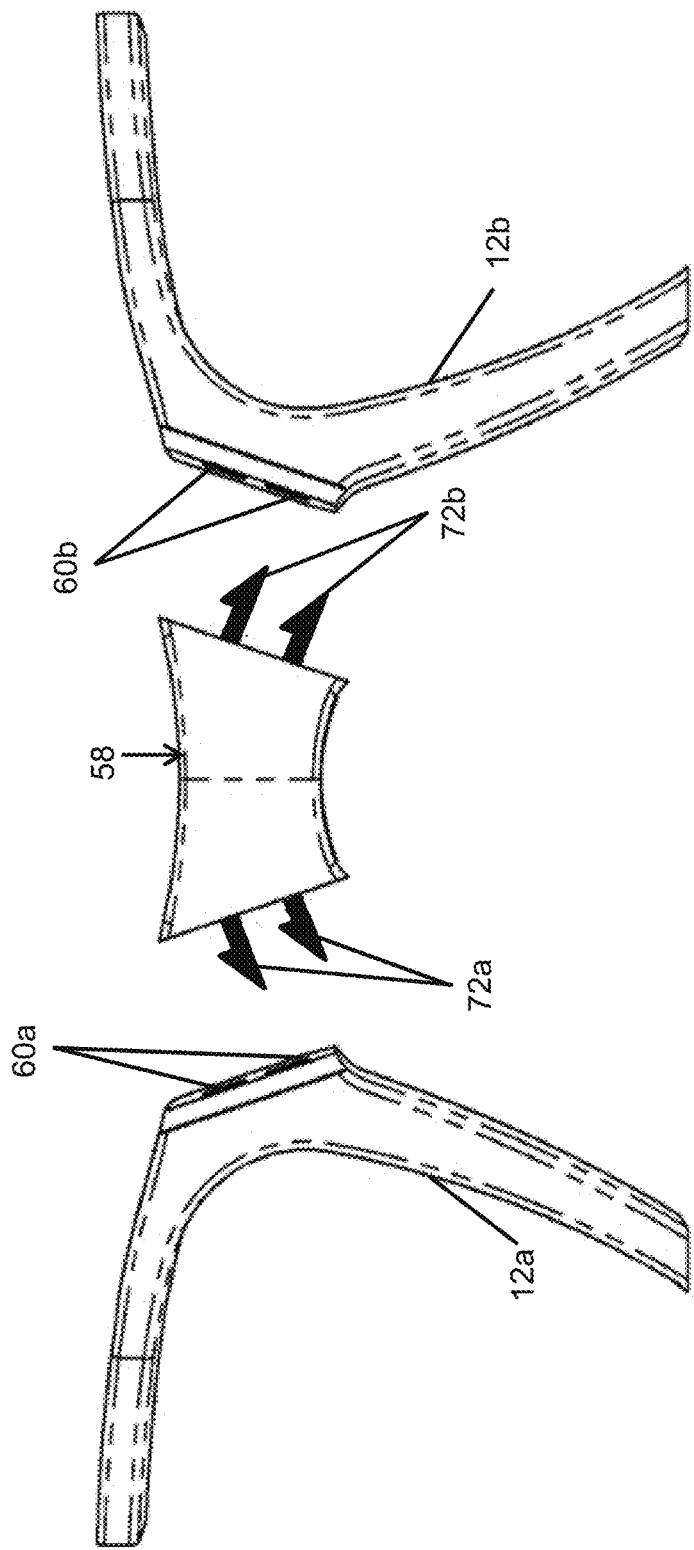
FIG. 20 is an exploded partial front view of the flexible bridge assembly utilizing yet another alternative prong design.

FIGS. 14, 15 and 16 show that the eyewear 10 may be assembled by inserting or snapping the prongs 54a, 54b of bridge assembly 48 into the lens retainer recesses 60 of lens retainers 12a, 12b. Snapping the prongs 56 into the lens retainer recesses 60 can cause the prongs to deform slightly to be seated within the lens retainer recesses 60. The overmolded bridge 58 can be snapped into the lens retainer recesses 60 permanently or detachably, depending on the shape of the prongs 56 and lens retainer recess 60.

FIGS. 17, 18, 19 and 20 show alternative prong designs which can be used including spherical prongs 66, conical prongs 68, D' prongs 70, and saw-tooth prongs 72. The lens retainer recesses 61, 60 can be shaped to match the shape of the prongs 70. In FIG. 17a, the prongs 66 are spherical in shape and thus, in the partial perspective view (FIG. 17b) of the lens retainer 12b, it can be seen that the lens retainer recesses 61 are shaped in a circular manner; such that the prongs 66 can be snapped into the lens retainer recesses 61. The shape of the lens retainer recesses 60 is dictated by the shape of the prong 66, 68, 70 or 72 that is to be inserted. Some prong shapes such as spherical prongs 66 are detachably snapped into the lens retainer recesses 61, such that they can be disjoined in needed. Other prong shapes such as the saw-tooth prongs 72 can permanently attach the overmolded bridge 58 to the lens retainer 12.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures, and components have not been described in detail so as not to obscure the examples described herein. Also, the description is not considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Although the above principles have been described with reference to certain specific examples, various modifications thereof will be apparent to those skilled in the art as outlined in the appended claims.

The invention claimed is:

1. A flexible bridge assembly for eyewear comprising:
   a flexible bridge portion having a first recess at one end, and a second recess at another end;
   a first rigid attachment member connected at a first end thereof to the first recess and being separate from a first lens retainer of eyewear; and a second rigid attachment member connected at a first end thereof to the second recess and being separate from a second lens retainer of eyewear;

wherein second ends of the first and second rigid attachment members provide attachment portions to attach the flexible bridge portion to the first and second lens retainers in assembling the eyewear.

2. The assembly of claim 1, wherein the flexible bridge portion and first and second attachment members are secured to each other via passages in each that are aligned when first and second attachment members are inserted into the first and second recesses of the flexible bridge portion.

3. The assembly of claim 2, wherein fasteners are inserted through the aligned passages to join the flexible bridge portion to the first and second attachment members.

4. The assembly of claim 3, wherein the fasteners comprise a resin inserted into the aligned passages and subsequently cured.

5. An eyewear assembly comprising the flexible bridge assembly of claim 1, coupled to a first lens retainer adapted to hold a first lens, and to a second lens retainer adapted to hold a second lens.

6. The eyewear assembly of claim 5, wherein the first lens retainer is provided with a third recess and the second lens retainer is provided with a fourth recess to receive the second ends of the first and second rigid attachment members.

7. The eyewear assembly of claim 6, wherein the first and second attachment members and the first and second lens retainers have passages that are aligned when the first and second attachment members are inserted into the third and fourth recesses.

8. The eyewear assembly of claim 7, wherein fasteners are inserted through the aligned passages through the lens retainers to join the flexible bridge assembly to the first and second lens retainers.

9. The eyewear assembly of claim 8, wherein the fasteners comprise a resin inserted into the aligned passages through the lens retainers and subsequently cured.

10. The eyewear assembly of claim 9, wherein the fasteners are processed to be flush with the lens retainers and the flexible bridge portion.

11. The eyewear assembly of claim 5, wherein the first attachment member comprises at least one prong and the second attachment member comprises at least one prong; wherein the at least one prong of the first rigid attachment member provides an attachment portion for the third recess of the first lens retainer; and the at least one prong of the second rigid attachment member provides an attachment portion for the fourth recess of the second lens retainer.

12. A flexible bridge assembly for eyewear comprising:
a flexible bridge portion;
a first rigid connecting end embedded in the flexible bridge portion at one end and being separate from a first lens retainer of eyewear; and
a second rigid connecting end embedded in the flexible bridge portion at the other end and being separate from a second lens retainer of eyewear;
wherein the first and second connecting ends provide attachment portions for joining the flexible bridge assembly to the first and second lens retainers of eyewear.

13. The assembly of claim 12, wherein the flexible bridge portion is overmolded over the first and second connecting ends.

14. The assembly of claim 13, wherein the first and second connecting ends each comprise at least one passage for receiving material applied in overmolding the flexible bridge.

15. An eyewear assembly comprising the flexible bridge assembly of claim 12 coupled to a first lens retainer adapted to hold a first lens, and to a second lens retainer adapted to hold a second lens.

16. The eyewear assembly of claim 15, wherein the first lens retainer is provided with a first recess and the second lens retainer is provided with a second recess for receiving the first and second connecting ends.

17. The eyewear assembly of claim 16, wherein the first and second connecting ends and the first and second lens retainers comprise passages that become aligned when the first and second connecting ends are inserted into the first and second recesses of the lens retainers.

18. The eyewear assembly of claim 17, wherein fasteners are inserted through the aligned passages to join the flexible bridge assembly to the first and second lens retainers.

19. The eyewear assembly of claim 18, wherein the fasteners are screws.

20. A flexible bridge assembly for eyewear comprising:
a flexible bridge portion;
a first rigid attachment member embedded in the flexible bridge portion at one end and being separate from a first lens retainer of eyewear, the first rigid attachment member having at least one first prong;
a second rigid attachment member embedded in the flexible bridge portion at the other end and being separate from a second lens retainer of eyewear, the second rigid attachment member having at least one second prong;
wherein the at least one first prong of the first rigid attachment member provides a first attachment portion to connect the flexible bridge assembly to at least one recess of the first lens retainer; wherein the at least one second prong of the second rigid attachment member provides a second attachment portion to connect the flexible bridge assembly to at least one recess of the second lens retainer.

21. The flexible bridge assembly of claim 20, wherein the flexible bridge portion and first and second attachment members are secured to each other via an overmolding process when passages of the first and second attachment members receive material during the overmolding process to create the flexible bridge portion.

22. The flexible bridge assembly of claim 20, wherein the at least one first prong and the at least one second prong are sized to snap into the recesses of the first and second lens retainers.

23. The flexible bridge assembly of claim 22, wherein the at least one first prong and the at least one second prong are shaped similarly to shapes of the recesses of the first and second lens retainers.

24. The flexible bridge assembly of claim 20, wherein the first rigid attachment member comprises a pair of first prongs and the second rigid attachment member comprises a pair of second prongs.

25. An eyewear assembly comprising the flexible bridge assembly of claim 20 coupled to a first lens retainer adapted to hold a first lens, and to a second lens retainer adapted to hold a second lens.

26. The eyewear assembly of claim 25, wherein the first lens retainer is provided with at least one first recess and the second lens retainer is provided with at least one second recess for receiving the at least one first and at least one second prong.

\* \* \* \* \*